United States Patent
Koda

(10) Patent No.: US 12,148,239 B2
(45) Date of Patent: *Nov. 19, 2024

(54) INFORMATION PROCESSING APPARATUS, INFORMATION PROCESSING METHOD, AND STORAGE MEDIUM

(71) Applicant: NEC CORPORATION, Tokyo (JP)

(72) Inventor: Yoshinori Koda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,561

(22) Filed: Jul. 26, 2023

(65) Prior Publication Data

US 2023/0368570 A1   Nov. 16, 2023

Related U.S. Application Data

(63) Continuation of application No. 17/610,762, filed as application No. PCT/JP2019/021159 on May 28, 2019, now Pat. No. 11,749,017.

(51) Int. Cl.
*G06V 40/12* (2022.01)
*G06V 40/13* (2022.01)

(52) U.S. Cl.
CPC .......... *G06V 40/1353* (2022.01); *G06V 40/13* (2022.01); *G06V 40/1359* (2022.01); *G06V 40/1371* (2022.01)

(58) Field of Classification Search
CPC .............. G06V 40/1353; G06V 40/13; G06V 40/1359; G06V 40/1371; G06V 10/50; G06V 10/759; G06T 7/00

See application file for complete search history.

(56) References Cited

U.S. PATENT DOCUMENTS

| | | |
|---|---|---|
| 2002/0154795 A1 | 10/2002 | Lee et al. |
| 2007/0003114 A1 | 1/2007 | Hendriks et al. |
| 2009/0310831 A1 | 12/2009 | Zhang et al. |
| 2010/0046810 A1 | 2/2010 | Yamada |

(Continued)

FOREIGN PATENT DOCUMENTS

| | | | |
|---|---|---|---|
| CO | 2018/0005389 A1 | 11/2018 | |
| GB | 2450479 A | * 12/2008 | ............. G06K 9/001 |

(Continued)

OTHER PUBLICATIONS

Indian Office Action for IN Application No. 202147053907 mailed on Apr. 25, 2022.

(Continued)

*Primary Examiner* — Premal R Patel
(74) *Attorney, Agent, or Firm* — Sughrue Mion, PLLC

(57) ABSTRACT

Provided are an information processing apparatus, an information processing method, and a storage medium capable of acquiring feature information relating to sweat gland pores that can realize highly accurate identification of an individual. The information processing apparatus includes: a sweat gland pore extraction unit that extracts sweat gland pores from an image including a skin marking; and an information acquisition unit that acquires sweat gland pore information including position information about the sweat gland pore and directional information about the sweat gland pore for each of the sweat gland pores.

15 Claims, 21 Drawing Sheets

(56) References Cited

U.S. PATENT DOCUMENTS

| | | | |
|---|---|---|---|
| 2011/0058714 A1* | 3/2011 | Hara | G06V 40/1353 |
| | | | 382/125 |
| 2012/0013724 A1 | 1/2012 | Mcnulty | |
| 2015/0347805 A1 | 12/2015 | McNulty | |
| 2017/0344846 A1 | 11/2017 | Yoshida | |
| 2021/0211515 A1 | 7/2021 | Rozo et al. | |

FOREIGN PATENT DOCUMENTS

| | | | |
|---|---|---|---|
| JP | H02-153478 A | 6/1990 |
| JP | H09-259272 A | 10/1997 |
| JP | 2735075 B2 | 4/1998 |
| JP | 2859794 B2 | 2/1999 |
| JP | 2000-201907 A | 7/2000 |
| JP | 2001-243467 A | 9/2001 |
| JP | 3434768 B2 | 8/2003 |
| JP | 2007-048000 A | 2/2007 |
| JP | 2007-272775 A | 10/2007 |
| JP | 2007-310676 A | 11/2007 |
| JP | 2010-049379 A | 3/2010 |
| JP | 4776384 B2 | 9/2011 |
| JP | 4776385 B2 | 9/2011 |
| JP | 2015-523876 A | 8/2015 |
| JP | WO2016/104712 A1 | 10/2017 |

OTHER PUBLICATIONS

International Search Report for PCT Application No. PCT/JP2019/021159, mailed on Sep. 3, 2019.

Extended European Search Report for EP Application No. EP19931153.1 dated on May 31, 2022.

Zhao Q et al., "High resolution partial fingerprint alignment using porevalley descriptors", Pattern Recognition, Elsevier, GB, vol. 43, No. 3, Mar. 1, 2010(Mar. 1, 2010), pp. 1050-1061.

Segundo Mauricio Pamplona et al., "Pore-based ridge reconstruction for fingerprint recognition", 2015 IEEE Conference on Computer Vision and Pattern Recognition Workshops (CVPRW), IEEE, Jun. 7, 2015 (Jun. 7, 2015), pp. 128-133.

Zhao Qijun et al., "Direct Pore Matching for Fingerprint Recognition", Jun. 2, 2009 (Jun. 2, 2009), Advances in Biometrics: International Conference, ICB 2007, Seoul, Korea, Aug. 27-29, 2007; Proceedings; [Lecture Notes in Computer Science; Lect. Notes Computer], Springer, Berlin, Heidelberg, pp. 597-606.

CO Office Action for Colombian Patent Application No. NC2021/0015904, mailed on Jul. 5, 2024 with English Translation.

\* cited by examiner

INFORMATION PROCESSING APPARATUS, INFORMATION PROCESSING METHOD, AND STORAGE MEDIUM

This application is a continuation of U.S. Ser. No. 17/610, 762, filed Nov. 12, 2021, which is a National Stage Entry of PCT/JP2019/021159 filed on May 28, 2019, the contents of all of which are incorporated herein by reference, in their entirety.

TECHNICAL FIELD

The disclosure relates to an information processing apparatus, an information processing method, and a storage medium.

BACKGROUND ART

PTL 1 discloses a method for identifying an individual by sweat glands of a finger. In the method disclosed in PTL 1, a binarized image of a fingerprint image is thinned and labeled, and a group in which the number of pixels in the labeling image is equal to or larger than a predetermined value is erased as a recess between fingerprint ridge lines, and the group remaining after the erasure is defined as a sweat gland, and the number is compared with a previously registered number to specify an individual.

CITATION LIST

Patent Literature

PTL 1: Japanese Patent No. 2859794
PTL 2: Japanese Patent Application Laid-Open No. 2007-272775
PTL 3: Japanese Patent Laid-Open No. H02-153478

SUMMARY

Technical Problem

However, in the method disclosed in PTL 1, since the individual is identified by comparing only the number of sweat glands, it is difficult to identify the individual with high accuracy.

It is an object of the disclosure to provide an information processing apparatus, an information processing method, and a storage medium capable of acquiring feature information relating to sweat gland pores that can realize highly accurate identification of an individual, in view of the above-mentioned issues.

Solution to Problem

According to one aspect of the disclosure, there is provided an information processing apparatus including: a sweat gland pore extraction unit that extracts sweat gland pores from an image including a skin marking; and an information acquisition unit that acquires sweat gland pore information including position information about the sweat gland pore and directional information about the sweat gland pore for each of the sweat gland pores.

According to another aspect of the disclosure, there is provided an information processing method including: extracting sweat gland pores from an image including a skin marking; and acquiring sweat gland pore information including position information about the sweat gland pore and directional information about the sweat gland pore for each of the sweat gland pores.

According to another aspect of the disclosure, there is provided a storage medium storing a program that causes a computer to perform: extracting sweat gland pores from an image including a skin marking; and acquiring sweat gland pore information including position information about the sweat gland pore and directional information about the sweat gland pore for each of the sweat gland pores.

Advantageous Effects

According to the disclosure, it is possible to acquire feature information relating to sweat gland pores that can realize highly accurate identification of an individual.

DESCRIPTION OF EMBODIMENTS

First Example Embodiment

An information processing apparatus and an information processing method according to a first example embodiment of the disclosure will be described with reference to FIGS. 1 to 8B.

Figure 1:
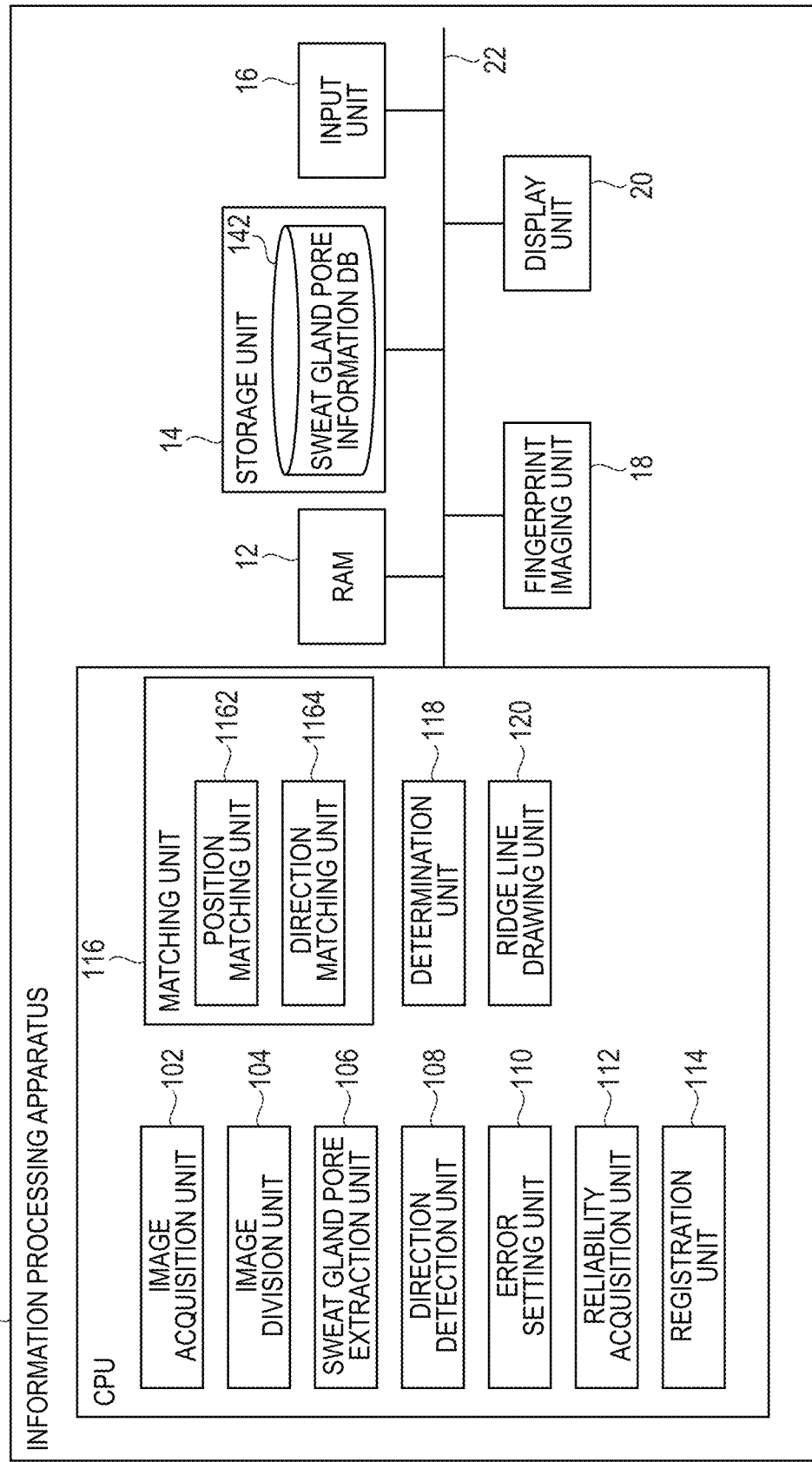
FIG. 1 is a block diagram illustrating a configuration of an information processing apparatus according to a first example embodiment.

First, the configuration of the information processing apparatus according to the example embodiment will be described with reference to FIG. 1. FIG. 1 is a block diagram illustrating a configuration of the information processing apparatus according to the example embodiment.

As illustrated in FIG. 1, the information processing apparatus 1 according to the example embodiment includes a CPU (Central Processing Unit) 10, a RAM (Random Access Memory) 12, a storage unit 14, an input unit 16, a fingerprint imaging unit 18, and a display unit 20. The CPU 10, the RAM 12, the storage unit 14, the input unit 16, the fingerprint imaging unit 18, and the display unit 20 are connected to the common bus 22.

The information processing apparatus 1 is not particularly limited, but is, for example, a computer apparatus such as a laptop or desktop personal computer. The information processing apparatus 1 may be, for example, a smartphone, a tablet type personal computer, or the like.

The CPU 10 operates by executing the program stored in the storage unit 14, and functions as a control unit for controlling the operation of the entire information processing apparatus 1. The CPU 10 executes a program stored in the storage unit 14 to perform various processes as the information processing apparatus 1. The RAM 12 provides a memory area necessary for the operation of the CPU 10. Specifically, the CPU 10 executes a program stored in the storage unit 14 to function as a functional unit as described below.

The information processing apparatus 1 according to the example embodiment functions as a feature information acquisition apparatus for acquiring and registering sweat gland pore information which is feature information relating to the sweat gland pore imaged on a fingerprint image of a finger of a target person to be registered from the fingerprint image. Since the CPU 10 of the information processing apparatus 1 functions as a feature information acquisition apparatus, the CPU 10 functions as an image acquisition unit 102, an image division unit 104, a sweat gland pore extraction unit 106, a direction detection unit 108, an error setting unit 110, a reliability acquisition unit 112, and a registration unit 114, as will be described later. The sweat gland pore extraction unit 106 and the direction detection unit 108 function as an information acquisition unit for acquiring sweat gland pore information for each sweat gland pore. The information processing apparatus 1 functioning as the feature information acquisition apparatus will be described in the example embodiment.

The information processing apparatus 1 also functions as a matching apparatus for identifying the target person by performing matching of the sweat gland pore information of the target person to be identified and the sweat gland pore information of the registered registrant. In order to function as the matching apparatus, the CPU 10 of the information processing apparatus 1 functions as a matching unit 116 and a determination unit 118, as will be described later. The information processing apparatus 1 functioning as matching apparatus will be described with reference to a second example embodiment.

Further, the information processing apparatus 1 also functions as a ridge line drawing apparatus for drawing a quasi ridge line which is a pseudo ridge line based on sweat gland pore information acquired from the fingerprint image. Since the CPU 10 of the information processing apparatus 1 functions as the ridge line drawing apparatus, it functions as the ridge line drawing unit 120 as will be described later. The information processing apparatus 1 functioning as a ridge line drawing apparatus will be described with reference to the third example embodiment.

The storage unit 14 comprises a storage medium such as a non-volatile memory such as a flash memory, a hard disk drive, or the like. The storage unit 14 stores programs executed by the CPU 10, data referred to by the CPU 10 when the programs are executed, and the like.

The storage unit 14 stores a sweat gland pore information database (DB, Database) 142. The sweat gland pore information DB 142 registers sweat gland pore information acquired from a fingerprint image of a finger of a registrant associated with personal information of the registrant. The registered sweat gland pore information that is sweat gland pore information registered in the sweat gland pore information DB 142 is matched with sweat gland pore information acquired from a fingerprint image of a finger of a target person to be identified when identifying the target person.

An input unit 16 receives input of information, instructions, etc., from an operator to the information processing apparatus 1. The operator can input an instruction for execution of processing and various kinds of information to the information processing apparatus 1 via the input unit 16. The input unit 16 is not particularly limited, but includes, for example, a keyboard, a mouse, and the like. The input unit 16 may be formed of, for example, a touch panel incorporated in the display unit 20.

The fingerprint imaging unit 18 is a fingerprint imaging device that images the belly of a finger of a target person to acquire a fingerprint image. The fingerprint imaging unit 18 images a fingerprint image including not only ridge lines and valleys but also sweat gland pores. The fingerprint imaging unit 18, for example, can image a fingerprint by receiving near-infrared light emitted from a finger, which enters a finger placed with its belly facing the imaging surface of the image sensor, is scattered in the finger, and is then received by the image sensor. The fingerprint imaging unit 18 can adjust the position of the fingerprint in the image area of the fingerprint image to a specific position, for example, by a guide structure for guiding and regulating the position of the finger when the finger is placed on the imaging surface. The method by which the fingerprint imaging unit 18 acquires the fingerprint image is not particularly limited as long as the fingerprint image including sweat gland pores can be acquired, and various methods can be employed.

The display unit 20 displays a screen such as a screen of a program for executing various processes in accordance with control by the CPU 10. The display unit 20 includes, for example, a liquid crystal display, an OLED (Organic Light Emitting Diode) display, and the like. The display unit 20 may be built in the information processing apparatus 1, which is a laptop or tablet personal computer, or may be an external display provided separately from the information processing apparatus 1. The display unit 20 may be constituted by a touch panel display in which a touch panel serving as an input unit 16 is incorporated.

It should be noted that some or all of the functions of the respective units in the information processing apparatus 1 described above need not necessarily be implemented by a single apparatus, but may be implemented by another external apparatus such as a server. For example, some or all of the functions of the respective units of the CPU 10 may be realized by a CPU of a server communicatively connected to the information processing apparatus 1 via a network. For example, the storage unit 14 may be realized by a storage device of a server, a network storage, or the like, which is communicatively connected to the information processing apparatus 1 via a network.

Thus, the information processing apparatus 1 according to the example embodiment is configured.

Fingerprints have the inequality of all people, which varies from person to person, and the constancy of life, which does not change throughout life. Therefore, fingerprints have come to be widely used in situations where individual identification is required. However, it has been difficult to extract fingerprint-related features for newborns and infants using conventional techniques.

In contrast, the information processing apparatus 1 according to the example embodiment acquires sweat gland pore information including position information about the sweat gland pores and direction information about the sweat gland pores for each of the sweat gland pores as feature information about the sweat gland pores included in the fingerprint image, as will be described below. The information processing apparatus 1 according to the example embodiment can acquire sweat gland pore information from a fingerprint image of a finger of a newborn infant or an infant. The ridge lines of the fingerprint are continuous ridge lines containing sweat gland pores. The location and other characteristics of the sweat glands associated with these ridge lines also vary from person to person. Therefore, the sweat gland pore information acquired by the information processing apparatus 1 according to the example embodiment can be used for identifying an individual including a newborn infant and an infant. Furthermore, since the sweat gland pore information includes not only position information but also direction information, it is possible to specify an individual with high accuracy.

It should be noted that the information processing apparatus 1 according to the example embodiment can acquire sweat pore information not only on the fingers of newborn infants and infants but also on the fingers of persons of all ages.

The finger for acquiring sweat the gland pore information is not particularly limited. The information processing apparatus 1 according to the example embodiment can acquire the sweat gland pore information on any finger from which a fingerprint image has been acquired. For example, the information processing apparatus 1 can acquire the sweat gland pore information from a fingerprint image of one or more fingers out of a total of 10 fingers of the thumb, index finger, middle finger, ring finger, and little finger of each of a left hand and a right hand. Also, not only the finger, for example, the information processing apparatus 1 can acquire the sweat gland pore information from the finger (toe) mark image for one or a plurality of toes among a total of 10 toes including the first toe, the second toe, the third toe, the fourth toe, and the fifth toe of each of a left foot and a right foot. Furthermore, the information processing apparatus 1 can acquire sweat gland pore information not only on the fingers and toes but also on any part including sweat gland pores and forming patterns on the skin. The information processing apparatus 1 can acquire sweat gland pore information from an image including skin markings other than fingerprints. The skin marking may include any part of the skin pattern, such as fingerprints, palms, footprints, etc.

Figure 2:
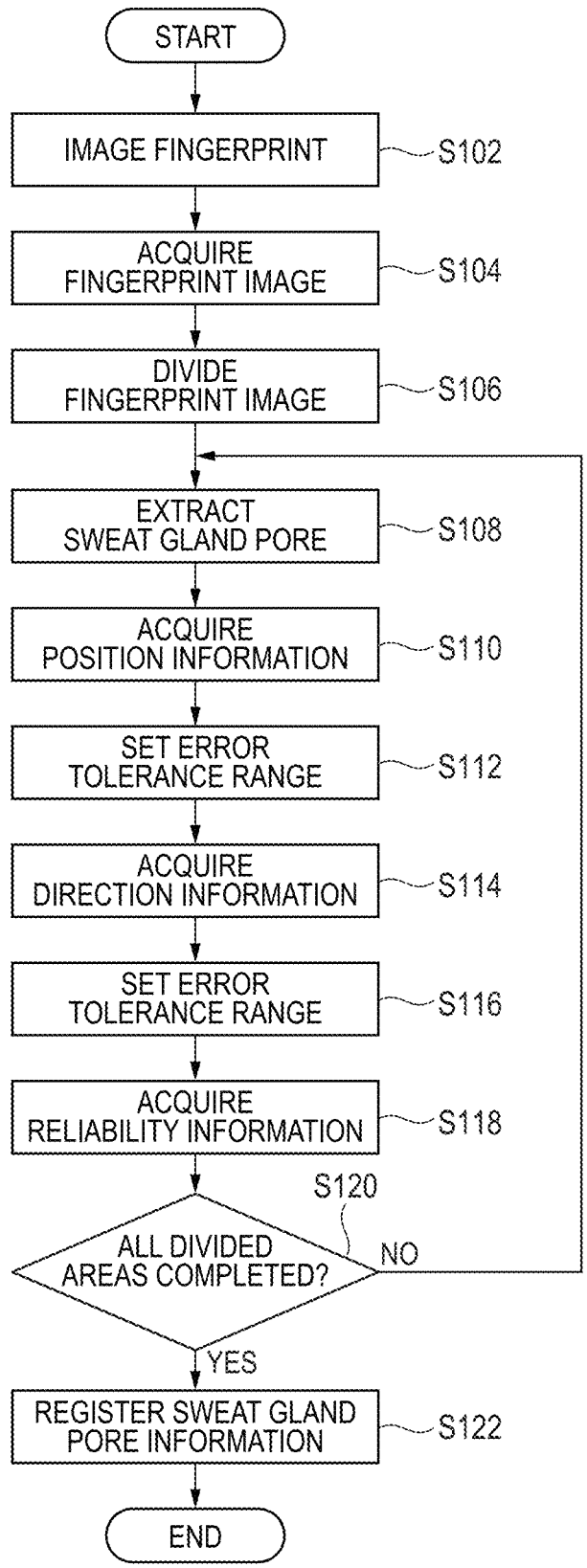
FIG. 2 is a flowchart illustrating an operation of acquiring sweat gland pore information in the information processing apparatus according to the first example embodiment.
Figure 3A:
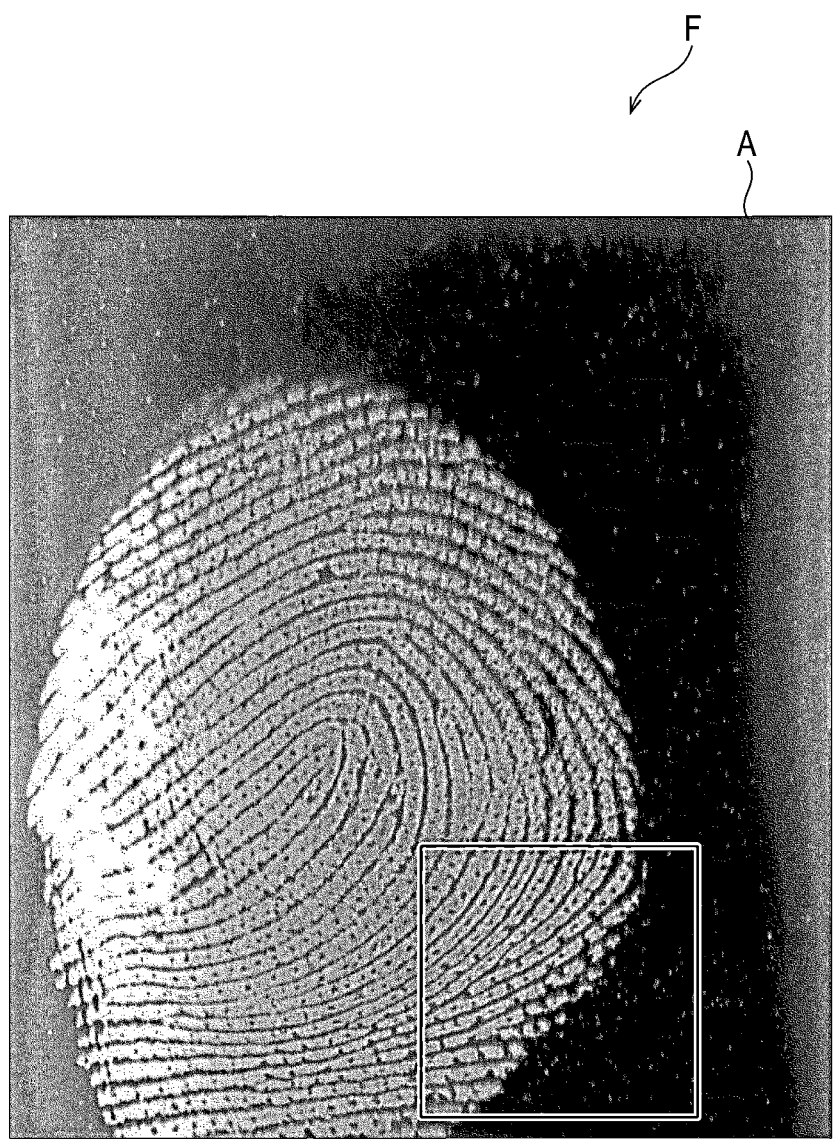
FIG. 3A shows an example of a fingerprint image taken by the fingerprint imaging unit.
Figure 3B:
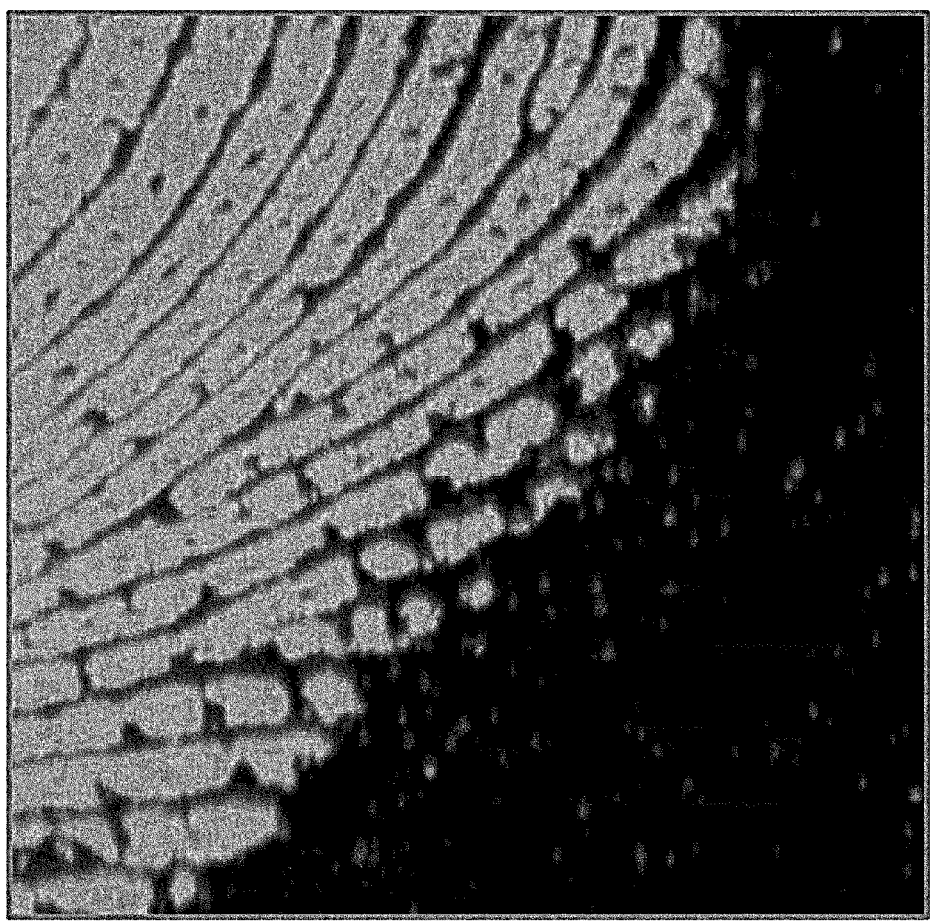
FIG. 3B shows an example of a fingerprint image taken by the fingerprint imaging unit.
Figure 4A:
FIG. 4A is a schematic diagram illustrating an example of fingerprint image segmentation processing in the information processing apparatus according to the first example embodiment.
Figure 4B:
FIG. 4B is a schematic diagram illustrating another example of the fingerprint image segmentation processing in an information processing apparatus according to first example embodiment.
Figure 5:
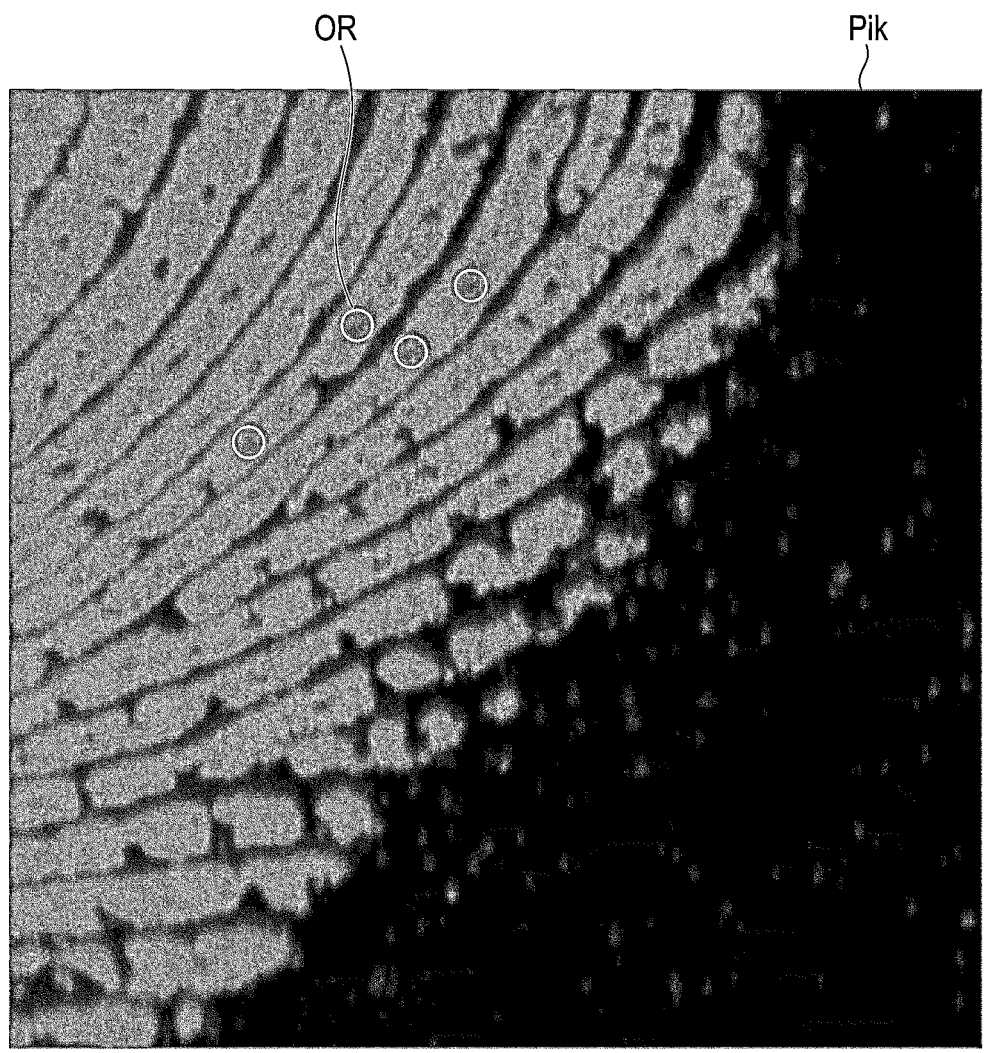
FIG. 5 is a schematic diagram illustrating an example of sweat gland pore extraction processing by an O-ring in the information processing apparatus according to first example embodiment.
Figure 6:
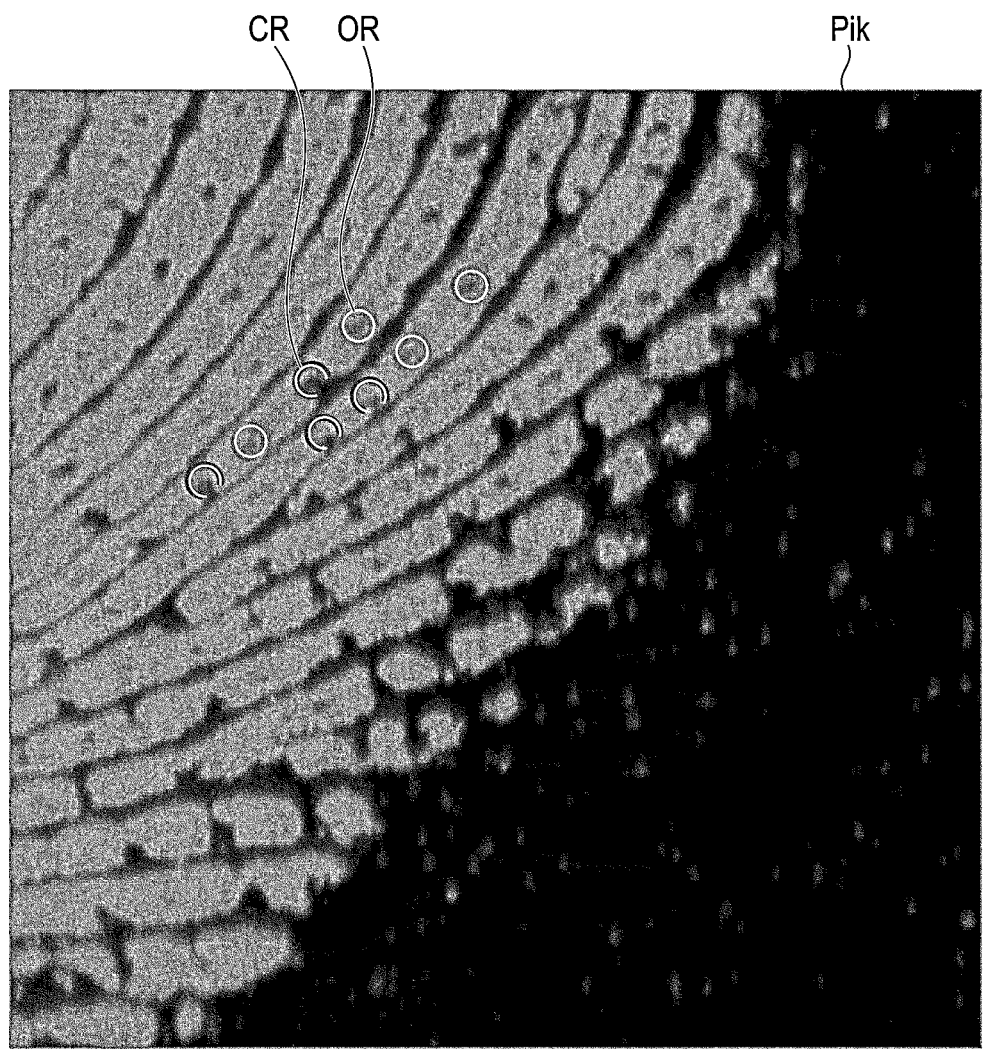
FIG. 6 is a schematic diagram illustrating an example of the sweat gland pore extraction processing by a C-ring in the information processing apparatus according to the first example embodiment.
Figure 7:
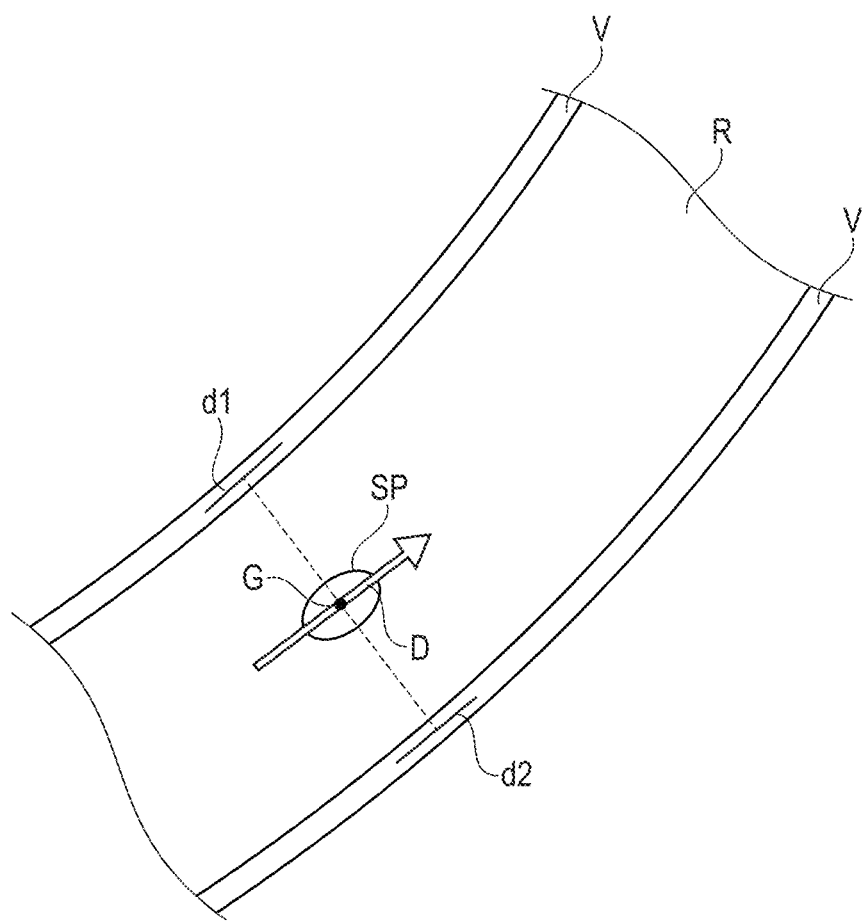
FIG. 7 is a schematic diagram illustrating processing for acquiring direction information of sweat gland pores in the information processing apparatus according to the first example embodiment.
Figure 8A:
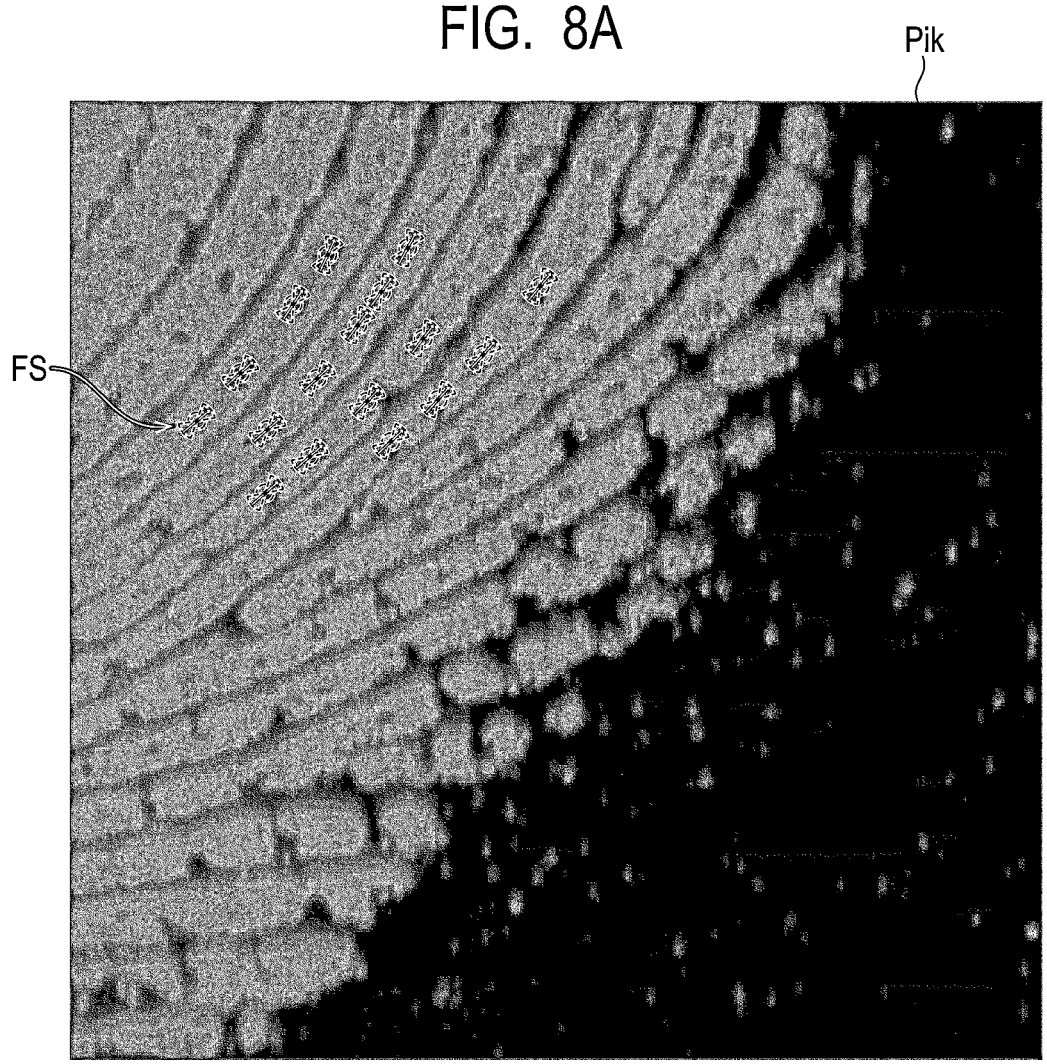
FIG. 8A is a schematic diagram illustrating an example of position information, direction information, and error tolerance range included in sweat gland pore information acquired in an information processing apparatus according to first example embodiment.
Figure 8B:
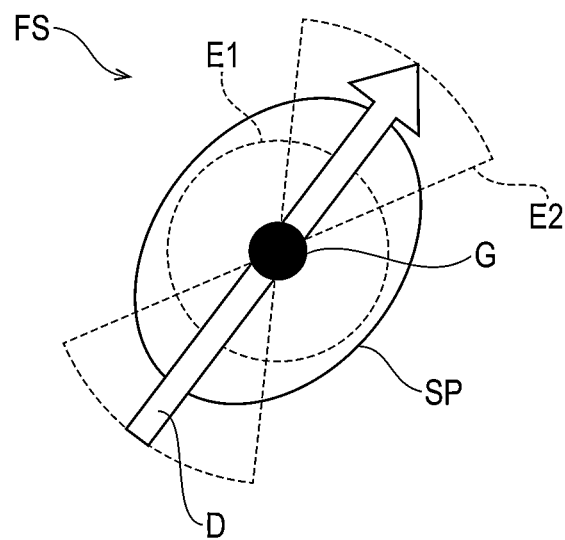
FIG. 8B is a schematic diagram illustrating an example of position information, direction information, and error tolerance range included in sweat gland pore information acquired in an information processing apparatus according to first example embodiment.

Hereinafter, the acquisition operation for acquiring the sweat gland pore information in the information processing apparatus 1 according to the example embodiment will be described with reference to FIGS. 2 to 8B. FIG. 2 is a flowchart illustrating an operation of acquiring the sweat gland pore information in the information processing apparatus 1. FIG. 3A is a diagram illustrating an example of a fingerprint image taken by the fingerprint imaging unit 18. FIG. 3B is an enlarged view of a rectangular area in the fingerprint image shown in FIG. 3A. FIG. 4A is a schematic diagram illustrating an example of the division processing of the fingerprint image in the information processing apparatus 1. FIG. 4B is a schematic diagram illustrating another example of the division processing of the fingerprint image in the information processing apparatus 1. FIG. 5 is a schematic diagram illustrating an example of extraction processing of sweat gland pores by an O-ring in the information processing apparatus 1. FIG. 6 is a schematic diagram illustrating an example of extraction processing of sweat gland pores by a C-ring in the information processing apparatus 1. FIG. 7 is a schematic diagram illustrating acquisition process of the direction information of the sweat gland pore in the information processing apparatus 1. FIGS. 8A and 8B are schematic diagrams illustrating an example of position information, direction information, and error tolerance range included in the sweat gland pore information acquired in the information processing apparatus 1. The information processing apparatus 1 according to the example embodiment operates to execute an information processing method according to the example embodiment for acquiring the sweat gland pore information.

First, as illustrated in FIG. 2, the fingerprint imaging unit 18 images a fingerprint of a finger of a target person to register sweat gland pore information (step S102). Thus, the fingerprint imaging unit 18 acquires and outputs a fingerprint image including sweat gland pores of the target person.

As shown in FIGS. 3A and 3B, the fingerprint image F imaged by the fingerprint imaging unit 18 is an image in which the fingerprint is imaged in the rectangular image area A. The fingerprint in the fingerprint image F is imaged so that the longitudinal direction of the finger is along a pair of sides in the longitudinal direction of the image area A. The fingerprint image F is, for example, a 256 gradation image having pixel values corresponding to the unevenness of the belly of the fingertip. In the fingerprint image F, pixels with higher heights are brighter pixels with higher pixel values. In this case, in the fingerprint image F, ridge lines are displayed brighter, valley lines are displayed darker, and sweat gland pores are displayed darker. In the fingerprint image F, the sweat gland pores are dark granular areas arranged in ridge lines which are bright linear areas sandwiched between valley lines which are dark linear areas. The correspondence between the unevenness of the belly of the fingertip and the pixel values may be opposite, and the pixels with higher heights may be darker pixels with lower pixel values. In the following description, a case will be described in which, in the fingerprint image, the higher the height, the brighter the pixel whose pixel value is higher.

When the fingerprint image is imaged by the fingerprint imaging unit 18, the CPU 10 executes the following processing by the functional unit realized by the execution of the program.

First, as illustrated in FIG. 2, the image acquisition unit 102 acquires the fingerprint image output by the fingerprint imaging unit 18 (step S104). When the position of the fingerprint in the image area of the fingerprint image does not match a specific position, the image acquisition unit 102 can prompt the user to re-image the fingerprint image by, for example, displaying a message on the display unit 20. In this case, the image acquisition unit 102 can also perform image processing for correcting the fingerprint image so that the fingerprint position matches a specific position.

Instead of acquiring the fingerprint image output by the fingerprint imaging unit 18, the image acquisition unit 102 may acquire the fingerprint image by reading the fingerprint image from the storage medium or by receiving the fingerprint image via the network.

Next, the image division unit 104 divides the fingerprint image acquired by the image acquisition unit 102 (step S106). Thus, the image division unit 104 divides the image area of the fingerprint image into a plurality of divided areas which are smaller than the image area.

As shown in FIGS. 4A and 4B, for example, the image division unit 104 can divide the image area A of the fingerprint image F into rectangular divided areas Pik in a grid shape. Herein, i is a positive integer satisfying 1≤i≤m, where m is an integer of 2 or more. k is a positive integer satisfying 1≤k≤n, where n is an integer of 2 or more. FIGS. 4A and 4B show a case where m and n are 3, respectively. The plurality of divided areas Pik have the same rectangular shape. In FIGS. 4A and 4B, the ridge lines are shown in black, and the valleys and sweat gland pores are shown in white for convenience in the fingerprint image.

As shown in FIG. 4A, the image division unit 104 can divide the image area A of the fingerprint image F so that adjacent divided areas do not overlap each other. Further, as illustrated in FIG. 4B, the image division unit 104 can divide the image area A of the fingerprint image F so that portions of the adjacent divided areas overlap each other. FIG. 4B shows a case where half of the divided areas adjacent to each other overlap.

It is not necessary for the image division unit 104 to divide the image area A of the fingerprint image F into a plurality of divided areas of the same shape. The image division unit 104 can divide the image area A of the fingerprint image F into a plurality of divided areas having mutually different shapes. The shape of the divided area is not limited to a rectangular shape, and various shapes can be adopted.

Next, the sweat gland pore extraction unit 106 extracts a plurality of sweat gland pores from the divided area of the fingerprint image divided by the image division unit 104 (step S108). The sweat gland pore extraction unit 106 can extract the sweat gland pore in the following manner.

First, as illustrated in FIG. 5, the sweat gland pore extraction unit 106 detects a granular area that fits in the O-ring OR, which is a closed circular ring having a diameter in a predetermined range, in the divided area Pik based on the information on the gradation in the divided area Pik of the fingerprint image. The granular area detected here is an area in a predetermined gradation range, that is, an area in which the height composed of pixels having a predetermined pixel value or less is a predetermined height or less. To fit in the O-ring OR means that a granular area enters the O-ring OR without contacting the O-ring OR. The sweat gland pore extraction unit 106 can detect a granular area while changing the diameter of the O-ring OR within a predetermined range. The sweat gland pore extraction unit 106 extracts the granular area detected by an O-ring OR as a sweat gland pore. In FIG. 5, four sweat gland pores are extracted by O-ring OR, and the other sweat gland pores are extracted in the same manner.

In the extraction of sweat gland pores by the O-ring OR, a granular area isolated from the valley line can be extracted as a sweat gland pore. On the other hand, in the fingerprint image, a sweat gland pore may be imaged as a granular area connected to the valley line. In the extraction of sweat gland pores by the O-ring OR, it is impossible to detect the granular area connected to the valley line.

Therefore, as illustrated in FIG. 6, the sweat gland pore extraction unit 106 further detects a granular area that fits in the C-ring CR, which is a partially open circular ring having a predetermined range of diameter in the divided area Pik, based on the information on the gradation in the divided area Pik of the fingerprint image. The C-ring CR is a circular ring having one open portion of a predetermined range of length. The granular area detected here is an area in a predetermined gradation range, that is, an area in which the height composed of pixels having a predetermined pixel value or less is a predetermined height or less. To fit in the C-ring CR means that a granular area enters inside the C-ring CR without contacting the C-ring CR, and a connection part with a valley line of the granular area enters an open portion of the C-ring CR. The sweat gland pore extraction unit 106 can change the diameter of the C-ring CR and the length of the open portion in a predetermined range, and detect a granular area while changing the position of the open portion in the C-ring CR. The sweat gland pore extraction unit 106 also extracts the granular area detected by the C-ring CR as a sweat gland pore. FIG. 6 shows a state in which four sweat gland pores are extracted by the C-ring CR in addition to the four sweat gland pores extracted by the O-ring OR, and the other sweat gland pores are extracted in the same manner.

Thus, the sweat gland pore extraction unit 106 extracts sweat gland pores not only by using the O-ring OR but also by using the C-ring CR, so that the sweat gland pores can be extracted with high accuracy. The sweat gland pore extraction unit 106 extracts the sweat gland pores using the O-ring OR first as described above, or extracts the sweat gland pores using the C-ring CR first among the extractions of the sweat gland pores using the O-ring and the C-ring. In addition, the sweat gland pore extraction unit 106 can execute both extraction of the sweat gland pore using the O-ring OR and extraction of the sweat gland pore using the C-ring CR in parallel. In addition, the sweat gland pore extraction unit 106 can extract sweat gland pores from the divided areas by various methods in addition to the above-described method.

Although the sweat gland pore extraction unit 106 uses the O-ring OR, which is a closed ring, and the C-ring CR, which is a partially open ring, for extracting the sweat gland pore, the ring for extracting the sweat gland pore does not necessarily have to be a circular ring. The sweat gland pore extraction unit 106 can use rings of various shapes as closed rings or partially open rings for extracting sweat gland pores for extracting sweat gland pore.

Further, as illustrated in FIG. 2, the sweat gland pore extraction unit 106 functions as an information acquisition unit for acquiring position information relating to the sweat gland pore, and acquires position information of the sweat gland pore for each of the plurality of extracted sweat gland pores (step S110). In acquiring the position information, the sweat gland pore extraction unit 106 calculates the coordinates of the center of gravity of the granular area extracted as the sweat gland pore in the two-dimensional coordinate system set in the fingerprint image. The sweat gland pore extraction unit 106 acquires coordinate information showing the calculated coordinates of the center of gravity as the coordinate information of the sweat gland pore, which is position information of the sweat gland pore. Thus, the sweat gland pore extraction unit 106 can acquire the coordinate information of the center of gravity of the sweat gland pore as the position information of the sweat gland pore.

Note that the sweat gland pore extraction unit 106 can acquire not only coordinate information of the center of gravity of the sweat gland pore but also coordinate information of a specific position of the sweat gland pore as the position information of the sweat gland pore. The position information of the sweat gland pore may be such that the position of the sweat gland pore can be identified.

Next, the error setting unit 110 sets an error tolerance range for the position information of the sweat gland pore acquired by the sweat gland pore extraction unit 106 (step S112). The error setting unit 110 can set a range of a predetermined distance or less from the coordinates of the sweat gland pore as an error tolerance range. The error setting unit 110 can relatively set an error tolerance range according to the image size of the fingerprint image.

Next, the direction detection unit 108 functions as an information acquisition unit for acquiring direction information relating to the sweat gland pore, and acquires the direction information of the sweat gland pore for each of the plurality of the sweat gland pores extracted by the sweat gland pore extraction unit 106 (step S114).

In acquiring the direction information, the direction detection unit 108 specifies the positions of the valley lines V on both sides located in the vicinity of the center of gravity G of the sweat gland pore SP in the ridge line R, as illustrated in FIG. 7. Next, the direction detection unit 108 acquires the directions d1 and d2 of the valley lines V on both sides at the identified nearest position. Next, as the direction information of the sweat gland pore SP, the direction detection unit 108 acquires information indicating the direction D obtained by averaging the directions d1 and d2, that is, vector information relating to a vector indicating the direction D and passing through the center of gravity G. The direction of the vector in the vector information indicating the direction D can be set arbitrarily or according to a certain rule as either one of the direction along the direction D and the opposite direction.

The direction detection unit 108 can acquire, as the direction information of the sweat gland pore, not only information indicating the averaged direction of the valley lines on both sides located nearest to the center of gravity of the sweat gland pore but also information indicating the direction related to the sweat gland pore. The direction information of the sweat gland pore may be a direction related to the sweat gland pore such as a direction at the position of the sweat gland pore of the ridge line where the sweat gland pore is located and a direction corresponding to the shape of the sweat gland pore.

Next, as illustrated in FIG. 2, the error setting unit 110 sets an error tolerance range for the direction information of the sweat gland pore acquired by the direction detection unit 108 (step S116). The error setting unit 110 can set, as the error tolerance range, a range of not more than a predetermined angle with the direction indicated by the direction information of the sweat gland pore as the center. In this way, the error tolerance ranges are set for the position information and the direction information of the sweat gland pore information. Therefore, even when the finger is deformed or displaced upon acquisition of the fingerprint image, the position information and the directional information can be appropriately matching by absorbing errors caused by the finger's deformation or displacement.

As described above, the error setting unit 110 does not necessarily set the error tolerance ranges for both the position information and the direction information of the sweat gland pore information. The error setting unit 110 can set an error tolerance range to at least one of the position information and the direction information of the sweat gland pore information.

Thus, the sweat gland pore extraction unit 106 and the direction detection unit 108 function as a feature information acquisition unit for acquiring sweat gland pore information which is feature information relating to the sweat gland pore, and acquires sweat gland pore information including position information and direction information. The sweat gland pore information includes the error tolerance range set for the position information and the error tolerance set for the direction information.

FIGS. 8A and 8B schematically show sweat gland pore information FS obtained for sweat gland pores extracted in divided areas Pik. The sweat gland pore information FS includes coordinate information of the center of gravity G of the sweat gland pore as the position information of the sweat gland pore. For the coordinate information of the center of gravity G, the error tolerance range E1 indicating a range of a predetermined distance or less from the coordinate of the center of gravity G which is the coordinate of the sweat gland pore is set. The sweat gland pore information FS includes vector information indicating the direction D obtained by averaging the directions of the valley lines on both sides located near the nearest side as the direction information of the sweat gland pore. For the vector information indicating the direction D, the error tolerance range E2 indicating a range of a predetermined angle or less around the direction D is set.

Note that the timings at which the steps S110 to S116 are executed are not limited to the above case. For example, each time a sweat gland pore is extracted in step S108, the steps S110 to S116 may be executed. For example, after steps S110 and S114 are executed, steps S112 and S116 may be executed.

Next, the reliability acquisition unit 112 acquires reliability information indicating reliability for the divided area from which the sweat gland pore information has been acquired (step S118). The reliability acquisition unit 112 can acquire, for example, the reliability information indicating higher reliability of the divided area as the number of sweat gland pores extracted in the divided area becomes larger. Further, the reliability acquisition unit 112 can acquire the reliability information indicating lower reliability of the divided area, for example, as the area of the area where the pixel value in the divided area is equal to or smaller than a predetermined threshold value and where there is no fingerprint is wider. The reliability acquisition unit 112 can acquire reliability information based on at least either the number of sweat gland pores or the area of the area without fingerprint. The reliability acquisition unit 112 acquires, as the reliability information of the divided area, a reliability score that is a score having a larger value as the reliability of the divided area is higher. The reliability score may be a score having a smaller value as the reliability of the divided area is higher.

The timing at which the step S118 is executed is not limited to the above case. For example, it may be performed following step S108 of extracting the sweat gland pores.

Next, the CPU 10 determines whether or not the processes in steps S108 to S118 have been completed for all the divided areas of the fingerprint image (step S120). If it is determined that the processes have not been completed for all the divided areas (step S120, NO), the CPU 10 executes the processing of steps S108 to S118 for the divided areas whose processing has not been completed.

On the other hand, if it is determined that the processes have been completed for all the divided areas (step S120, YES), the registration unit 114 registers the sweat gland pore information acquired for the fingerprint image in the sweat gland pore information DB 142 in the storage unit 14 (step 122). At the time of registration, the registration unit 114 registers an identification number for uniquely identifying the target person whose fingerprint image was acquired, the sweat gland pore information acquired for each divided area of the fingerprint image, the reliability information of each divided area, and personal information of the target person in association with each other. The personal information is, for example, a name, a sex, a date of birth, a contact, etc. The personal information is inputted, for example, by an operator to the information processing apparatus 1 through the input unit 16.

Thus, the information processing apparatus 1 can acquire and register the sweat gland pore information including the position information and the direction information relating to the sweat gland pores as the feature information relating to the sweat gland pores extracted from the fingerprint image for the target person.

In the sweat gland pore information DB 142, sweat gland pore information of a plurality of registrants is registered and stored by executing the processing for a plurality of target persons.

As described above, according to the example embodiment, the sweat gland pore information including not only the position information about the sweat gland pores but also the direction information about the sweat gland pores is acquired as feature information, so that it is possible to acquire the feature information relating to the sweat gland pores that can realize highly accurate identification of an individual.

Second Example Embodiment

An information processing apparatus and an information processing method according to a second example embodiment of the disclosure will be described with further reference to FIGS. 9 to 11. Note that the same components as those in the information processing apparatus and the information processing method according to the first example embodiment described above are labeled with the same references, and the description thereof will be omitted or simplified. In example embodiment, the information processing apparatus 1 functioning as a matching apparatus for identifying a target person by performing matching of the sweat gland pore information of the target person to be identified and the registered sweat gland pore information of the registrant will be described. Since the CPU 10 of the information processing apparatus 1 according to the example embodiment functions as matching apparatus, the CPU 10 further functions as the matching unit 116 and the determination unit 118, as illustrated in FIG. 1. The matching unit 116 includes a position matching unit 1162 and a direction matching unit 1164.

The number of sweat gland pores in a fingerprint is distributed in a specific range according to race. For this reason, it is considered to be difficult to identify individuals with high accuracy simply by matching the number of sweat gland pores. In contrast, in the example embodiment, the sweat gland pore information, which is the feature information including a plurality of pieces of information such as the position information and the direction information, is matched, so that it is possible to identify an individual with high accuracy.

The matching operation in the information processing apparatus 1 according to the example embodiment will be described below with reference to FIGS. 9 to 11. FIG. 9 is a flowchart illustrating the matching operation in the information processing apparatus 1. FIG. 10 is a schematic diagram illustrating an example of the matching processing based on the position information of the sweat gland pores in the information processing apparatus 1. FIG. 11 is a schematic diagram illustrating an example of the matching processing based on the direction information of the sweat gland pores in the information processing apparatus 1. The information processing apparatus 1 according to the example embodiment operates to execute an information processing method according to the example embodiment for matching the sweat gland pore information.

The information processing apparatus 1 acquires the sweat gland pore information, the reliability information, and the like by performing steps S102 to S120 illustrated in FIG. 2 for a fingerprint image of a target person to be identified by a matching the sweat gland pore information, as in the case of the first example embodiment.

When target sweat gland pore information which is the sweat gland pore information of the target person is acquired from a fingerprint image of the target person to be identified, the CPU 10 performs the following processes by functional units realized by executing a program to matching the sweat gland pore information.

Figure 9:
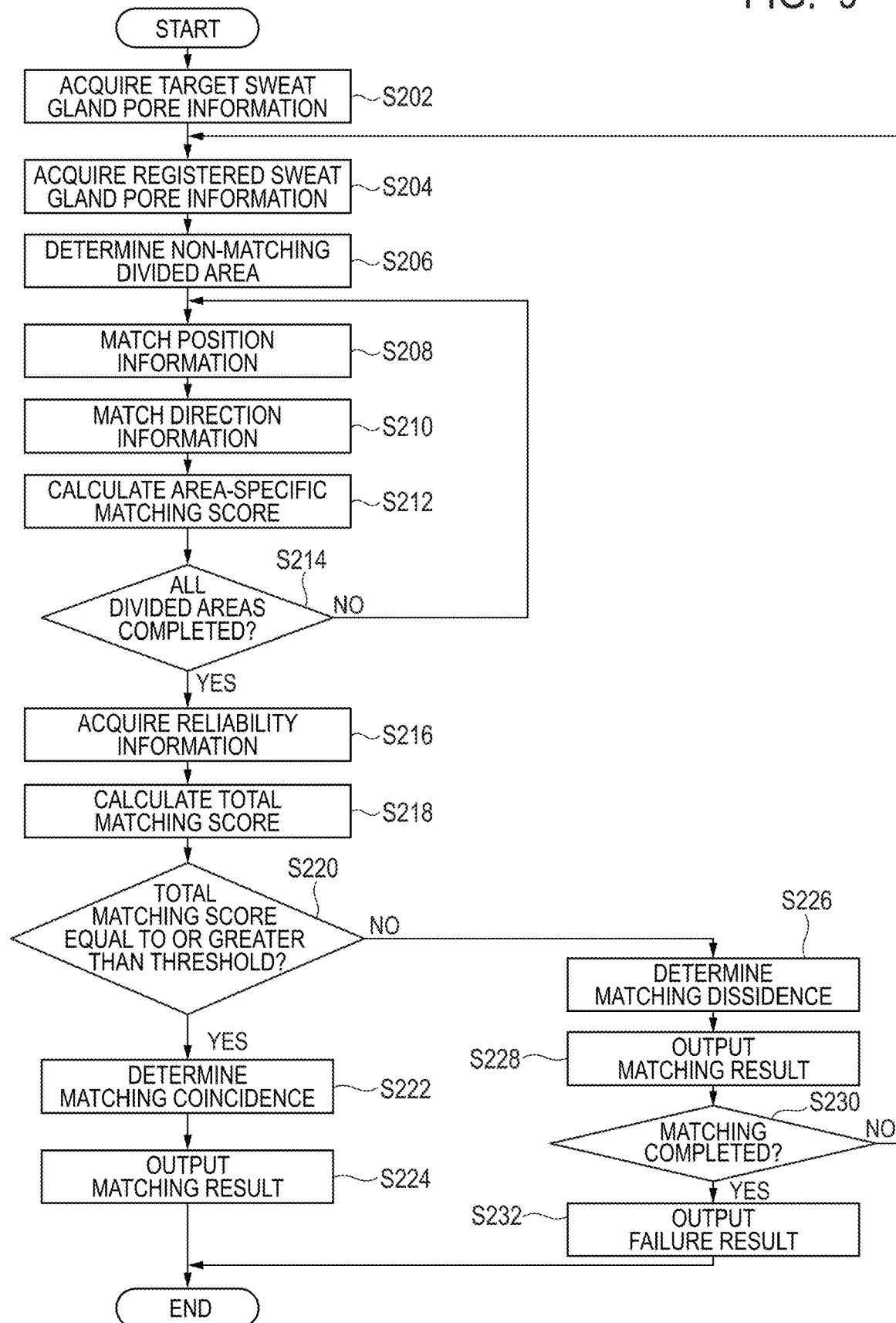
FIG. 9 is a flowchart illustrating matching operation in an information processing apparatus according to a second example embodiment.

First, as illustrated in FIG. 9, matching unit 116 acquires target sweat gland pore information (step S202).

Next, matching unit 116 reads out and acquires registered sweat gland pore information, which is the sweat gland pore information of the registrant registered in the sweat gland pore information DB 142 of the storage unit 14, from the sweat gland pore information DB 142 (step S204).

The matching unit 116 performs matching for each divided area corresponding to the target sweat gland pore information and the registered sweat gland pore information. Prior to matching for each divided area, the matching unit 116 determines a non-matching divided area, which is a divided area for which matching of the sweat gland pore information is not performed, based on the reliability information of both divided areas corresponding to each other of the target sweat gland pore information and the registered sweat gland pore information (step S206). That is, the matching unit 116 determines both divided areas as the non-matching divided areas when the reliability information of one of the two divided areas corresponding to the target sweat gland pore information and the registered sweat gland pore information shows low the reliability below a certain level. For example, if one of the reliability scores is equal to or less than a predetermined threshold value and indicates a low reliability equal to or less than a predetermined value, the matching unit 116 can determine both divided areas as the non-matching divided areas. Thus, the matching unit 116 matches the sweat gland pore information about the divided areas having a predetermined reliability or higher among the plurality of divided areas.

The matching unit 116 matches the target sweat gland pore information and the registered sweat gland pore information for each division area corresponding to each other except the determined non-matching division area as follows.

First, the position matching unit 1162 matching the position information of the sweat gland pore included in the divided area of the target sweat gland pore information and the position information of the sweat gland pore included in the divided area of the corresponding registered sweat gland pore information (step S208). Hereinafter, the divided area of the target sweat gland pore information is appropriately referred to as the target divided area, and the divided area of the registered sweat gland pore information is appropriately referred to as the registered divided area. The position matching unit 1162 determines whether or not the position information of the sweat gland pore included in the target division area and the position information of the sweat gland pore included in the registered division area coincide with each other within error tolerance ranges set respectively. Thus, the position matching unit 1162 identifies the set of sweat gland pores matching the position information within the error tolerance ranges. As described above, since the position information is matched in consideration of the error tolerance range, even when deformation or displacement of the finger occurs in acquiring the fingerprint image, the position information can be appropriately matching by absorbing errors due to deformation or displacement of the finger.

Figure 10:
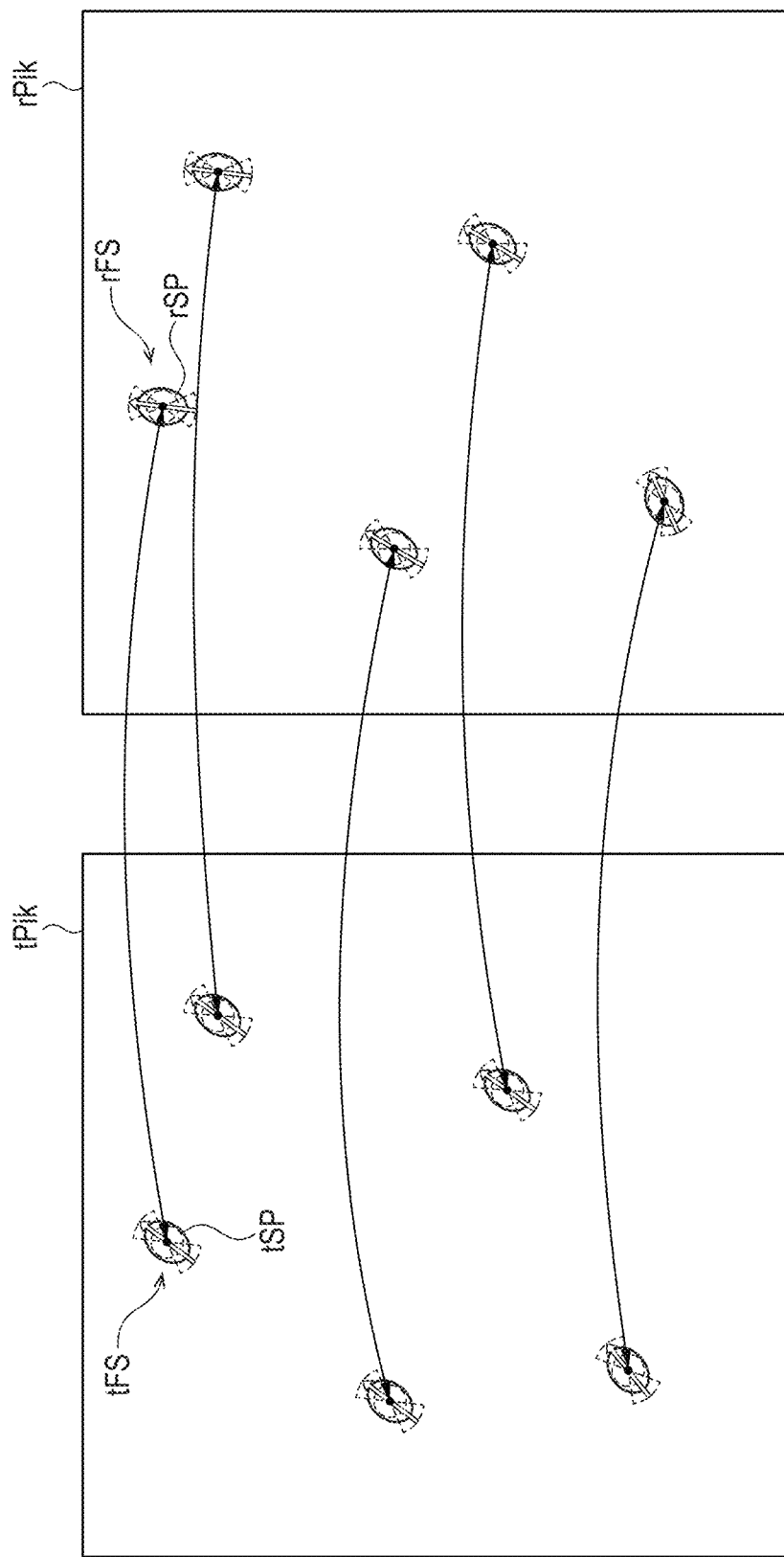
FIG. 10 is a schematic diagram illustrating an example of matching processing based on position information of sweat gland pores in the information processing apparatus according to the second embodiment.

Specifically, as illustrated in FIG. 10, the position matching unit 1162 matches the position information of the sweat gland pore information tFS of the sweat gland pore tSP included in the target divided area tPik and the position information of the sweat gland pore information rFS of the sweat gland pore rSP included in the registered divided area rPik. The position matching unit 1162 matches the position information of the sweat gland pore information tFS and the position information of the sweat gland pore information rFS about the set of the sweat gland pores tSP, rSP which may correspond to each other.

Next, as illustrated in FIG. 9, the direction matching unit 1164 matches the direction information about the set of sweat gland pores of which the position information coincides within the error tolerance ranges (step S210). The direction matching unit 1164 determines whether or not the direction information of the sweat gland pore included in the target divided area and the direction information of the sweat gland pore included in the registered divided area coincide with each other within error tolerance ranges set for each set of the sweat gland pores. Thus, the direction matching unit 1164 identifies a set of sweat gland pores in which the direction information coincides within error tolerance ranges. As described above, since the direction information is matched in consideration of the error tolerance range, even when deformation, displacement or the like of the finger occurs in acquiring the fingerprint image, the direction information can be appropriately matched by absorbing errors due to deformation, displacement or the like of the finger.

Figure 11:
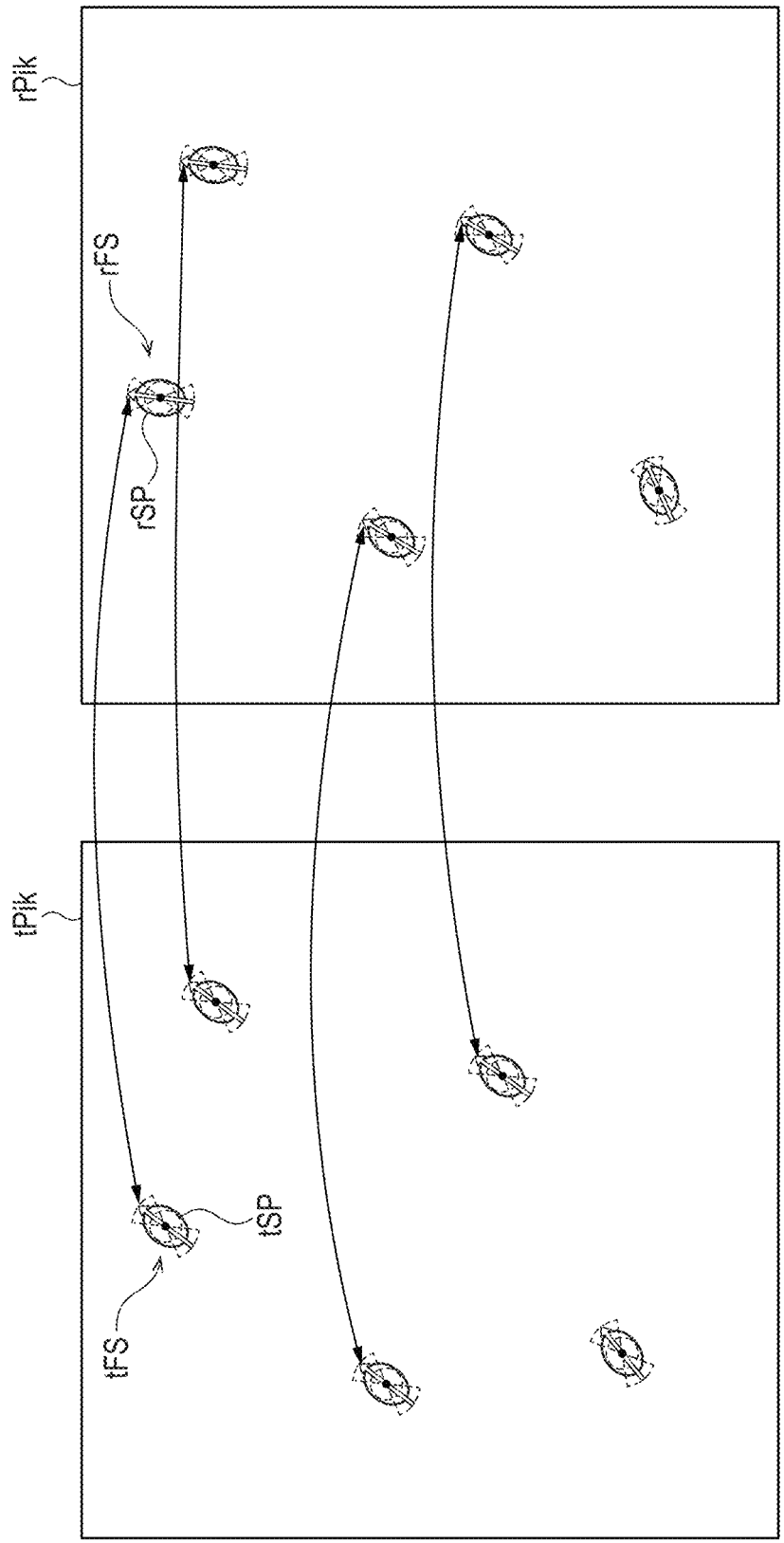
FIG. 11 is a schematic diagram illustrating an example of matching processing based on direction information of sweat gland pores in the information processing apparatus according to the second example embodiment.

Specifically, as illustrated in FIG. 11, the direction matching unit 1164 matches the direction information of the sweat gland pore information tFS and the direction information of the sweat gland pore information rFS about the set of the sweat gland pore tSP and rSP whose position information coincides within the error tolerance ranges.

Next, as illustrated in FIG. 9, based on the results of the matching performed by the position matching unit 1162 and the direction matching unit 1164, the matching unit 116 calculates a matching score for each divided area showing the matching result (step S212). The matching unit 116 calculates a higher area-specific matching score as the number of sets of the sweat gland pores in which both the position information and the direction information coincide within the error tolerance ranges becomes larger. Note that the elevation of the area-specific matching score may be reversed. That is, the matching unit 116 can also calculate a lower area-specific matching score as the number of sets of the matched sweat gland pore becomes larger. In this case, for the reliability score of the divided area, a score having a smaller value can be used as the reliability score of the divided area becomes higher.

Next, the matching unit 116 determines whether or not the processes in steps S208 to S212 have been completed for all divided areas except the non-matching divided areas (step S214). If it is determined that the processes have not been completed for all the divided areas (step S214, NO), the matching unit 116 executes the processes of steps S208 to S212 for the divided areas for which processing has not been completed.

On the other hand, when it is determined that the processes have been completed for all the divided areas (Step S214, YES), the matching unit 116 acquires the reliability information for each of the target divided areas and the registration divided areas excluding the non-matching divided areas (step S216).

Next, the matching unit 116 calculates a total matching score reflecting the reliability information based on the area-specific matching score and the reliability information (step S218). The matching unit 116 can calculate the total matching score as follows. First, the matching unit 116 calculates a weighted score for each of the area-specific matching scores calculated for each divided area by multiplying the area-specific matching scores by the reliability scores of the corresponding target divided areas and the registration divided areas. Then, the matching unit 116 sums the weighted scores calculated for each of matching scores by area to calculate the total matching score.

When calculating the weighted score, the matching unit 116 can multiply various weights instead of multiplying the area-specific matching score by the reliability scores of the target divided area and the registration divided area as weights. For example, the matching unit 116 may multiply the area-specific matching score for each area by a lower score of either the reliability score of the target divided area or the reliability score of the registered divided area as a weight. Further, for example, the matching unit 116 can also multiply the area-specific matching score for each area by the average value of the reliability score of the target divided area and the reliability score of the registered divided area as a weight.

The determination unit 118 determines whether or not the target person is a registrant based on the total matching score calculated by the area-specific matching score which is the matching result for each divided area and the reliability score which is reliability information of the divided area as follows.

First, the determination unit 118 determines whether or not the total matching score calculated by matching unit 116 is equal to or greater than a predetermined threshold (step S220). In the case where the height of matching score for each area is reversed as described above, the determination unit 118 can determine by reversing the comparison with the threshold value.

If it is determined that the total matching score is not less than a predetermined threshold value (step S220, YES), the determination unit 118 determines that matching of the target sweat gland pore information and the registered sweat gland pore information coincide (step S222). In this case, the determination unit 118 determines that the target person to be identified is a registrant of the registered sweat gland pore information who has performed matching, and specifies the target person.

Next, the determination unit 118 outputs the matching result indicating that the target sweat gland pore information coincides with the registered sweat gland pore information and information about the registrant of the registered sweat gland pore information coinciding with the target sweat gland pore information (step S224). The determination unit 118 can acquire and output, as the matching result, the personal information of the registrant associated with the registered sweat gland pore information matching the target sweat gland pore information from the sweat gland pore information DB 142. The determination unit 118 can output the total matching score as the matching result. The determination unit 118 can display matching result on the display unit 20 and output the matching result, for example. The determination unit 118 can also output, for example, the matching result by voice from a speaker (not shown).

The determination unit 118 can output a probability indicating that the target person is a registrant based on the total matching score, instead of identifying the target person as a registrant.

Thus, the determination unit 118 can identify the target person from whom the target sweat gland pore information has been acquired as the registrant of the registered sweat gland pore information that matches the target sweat gland pore information.

On the other hand, if it is determined that the total matching score is less than a predetermined threshold value (step S220, NO), the determination unit 118 determines that matching of the target sweat gland pore information and the registered sweat gland pore information do not coincide (step S226). In this case, the determination unit 118 determines that the target person to be identified is not a registrant of the registered sweat gland pore information for which the matching is performed.

Next, the determination unit 118 outputs the matching result indicating that the target sweat gland pore information does not match the registered sweat gland pore information (step S228). The determination unit 118 can output the total matching score as the matching result. The determination unit 118 can display the matching result on the display unit 20 and output the matching result, for example. The determination unit 118 can also output, for example, the matching result by voice from a speaker (not shown). The determination unit 118 may omit the output of matching result when the target sweat gland pore information does not match the registered sweat gland pore information.

Next, the determination unit 118 determines whether or not matching with the matching targets of the plurality of registered sweat gland pore information registered in the sweat gland pore information DB 142 is completed (step S230). The determination unit 118 can set all of the plurality of registered sweat gland pore information registered in the sweat gland pore information DB 142 as the matching target. Further, the determination unit 118 can narrow down a part of the plurality of registered sweat gland pore information to be the matching target. The determination unit 118 can narrow down the matching targets by using, for example, information such as gender and date of birth included in the personal information of the registrant associated with the registered sweat gland pore information.

When it is determined by the determination unit 118 that the matching is not completed (Step S230, NO), the CPU 10 proceeds to step S204, and executes the matching of the target sweat gland pore information with the registered sweat gland pore information which is not matched.

On the other hand, when the determination unit determines that the matching has been completed (step S230, YES), the determination unit 118 outputs a failure result indicating that the identification of the target person from which the target sweat gland pore information has been acquired has failed (step S232). The determination unit 118 can display the failure result on the display unit 20 and output the failure result, for example. In addition, the determination unit 118 can output, for example, a failure result by voice from a speaker (not shown).

As described above, according to example embodiment, the sweat gland pore information including the position information and the direction information relating to the sweat gland pore is matched to identify the target person, so that it is possible to identify an individual with high accuracy.

Third Example Embodiment

An information processing apparatus and an information processing method according to a third example embodiment of the disclosure will be described further with reference to FIGS. 12 to 20. Note that the same components as those in the information processing system and the information processing method according to the first and second example embodiments described above are labeled with the same references, and the description thereof will be omitted or simplified.

In the example embodiment, the information processing apparatus 1 functioning as a ridge line drawing apparatus for drawing a quasi ridge line, which is a quasi ridge line, based on the sweat gland pore information including the position information and the direction information acquired from a fingerprint image will be described. The information processing apparatus 1 draws the thinned quasi ridge line. Since the CPU 10 of the information processing apparatus 1 according to the example embodiment functions as a ridge line drawing apparatus, the CPU 10 further functions as the ridge line drawing unit 120, as illustrated in FIG. 1. The drawing of the quasi ridge line includes generating image data of the quasi ridge line, storing the image data of the generated image in a storage medium such as the RAM 12 or the storage unit 14, and displaying the quasi ridge line on the display unit 20.

Figure 12:
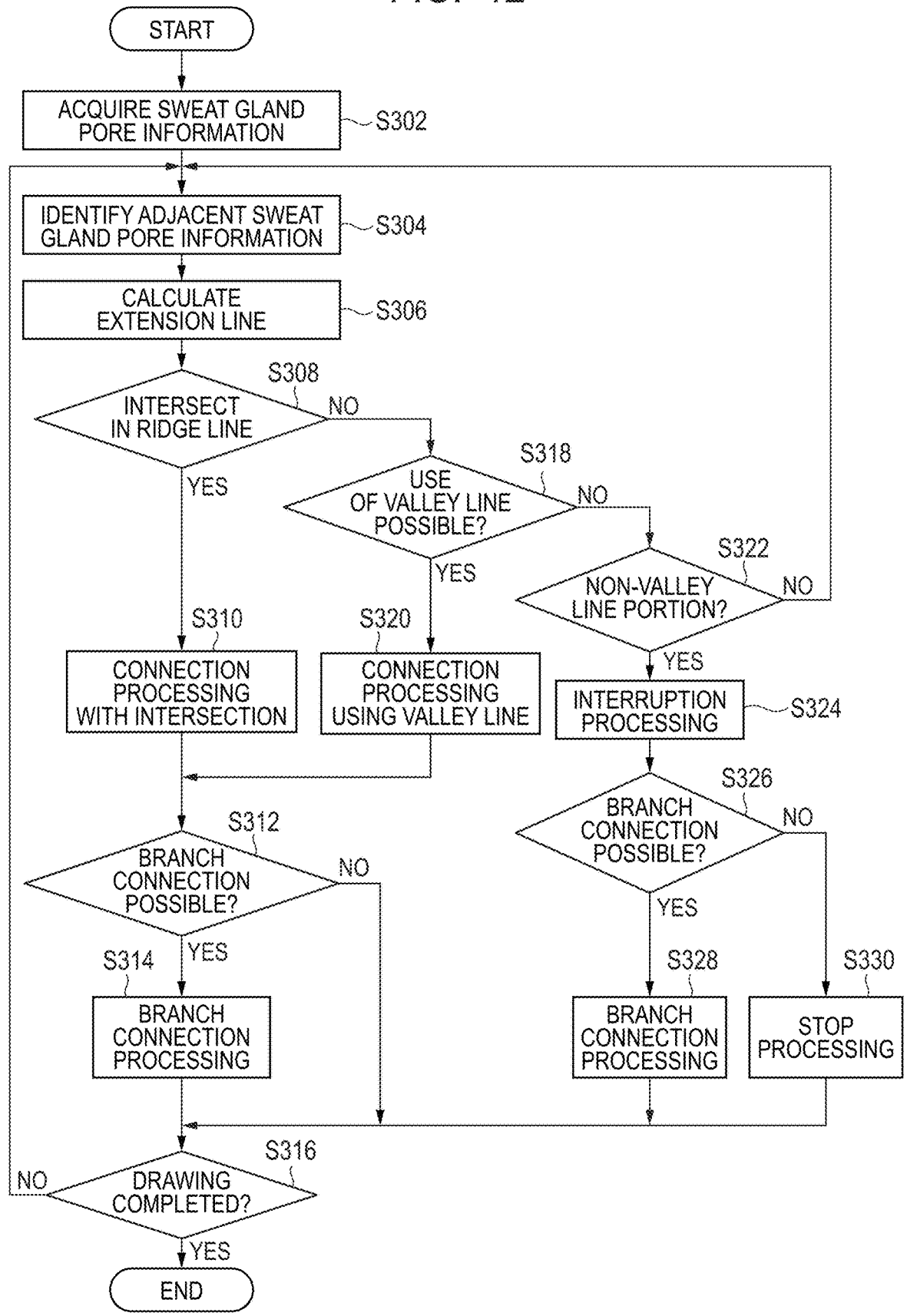
FIG. 12 is a flowchart illustrating a drawing operation of a quasi ridge line in an information processing apparatus according to a third example embodiment.
Figure 13:
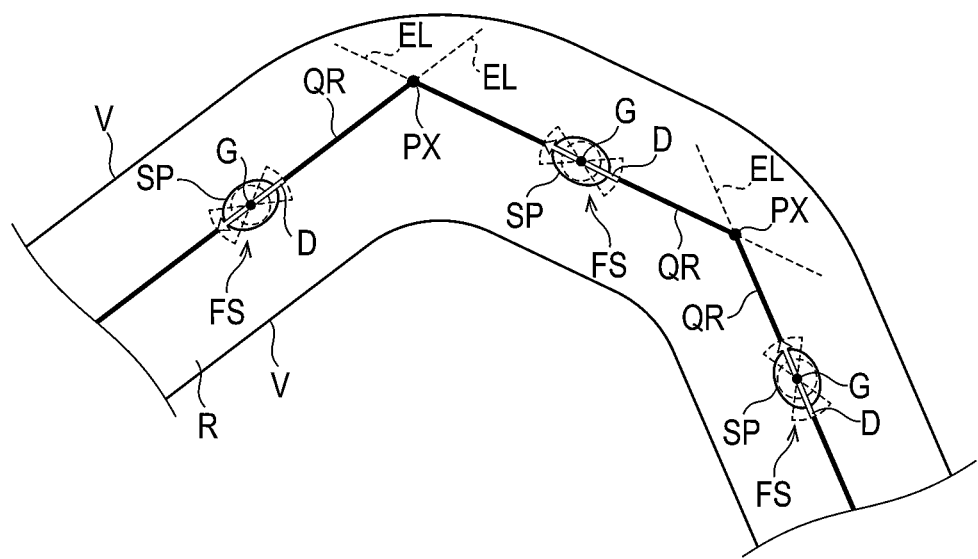
FIG. 13 is a schematic diagram illustrating an example of connection processing at an intersection in the drawing operation of the quasi ridge line in the information processing apparatus according to the third example embodiment.
Figure 14:
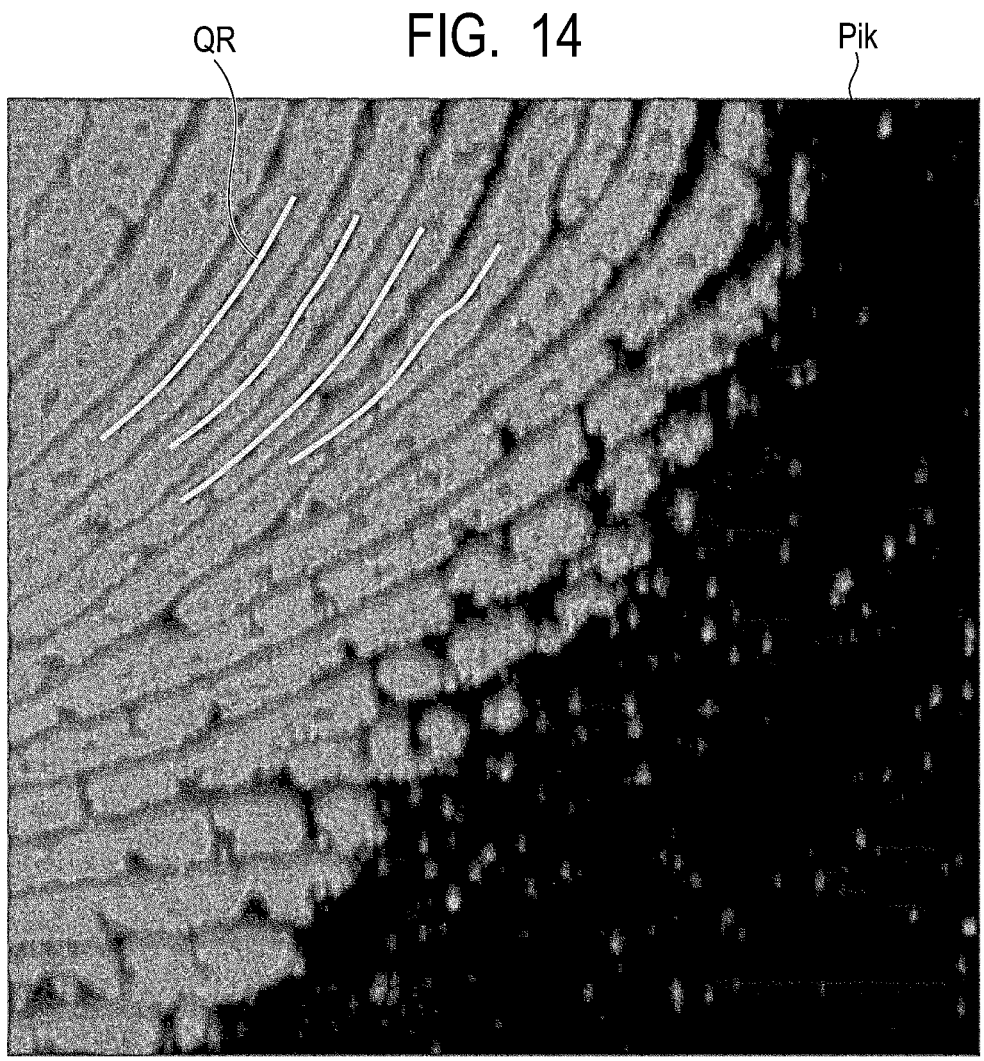
FIG. 14 is a schematic diagram illustrating an example of the quasi ridge drawn by the connection processing at an intersection in the drawing operation of the quasi ridge in the information processing apparatus according to the third example embodiment.
Figure 15:
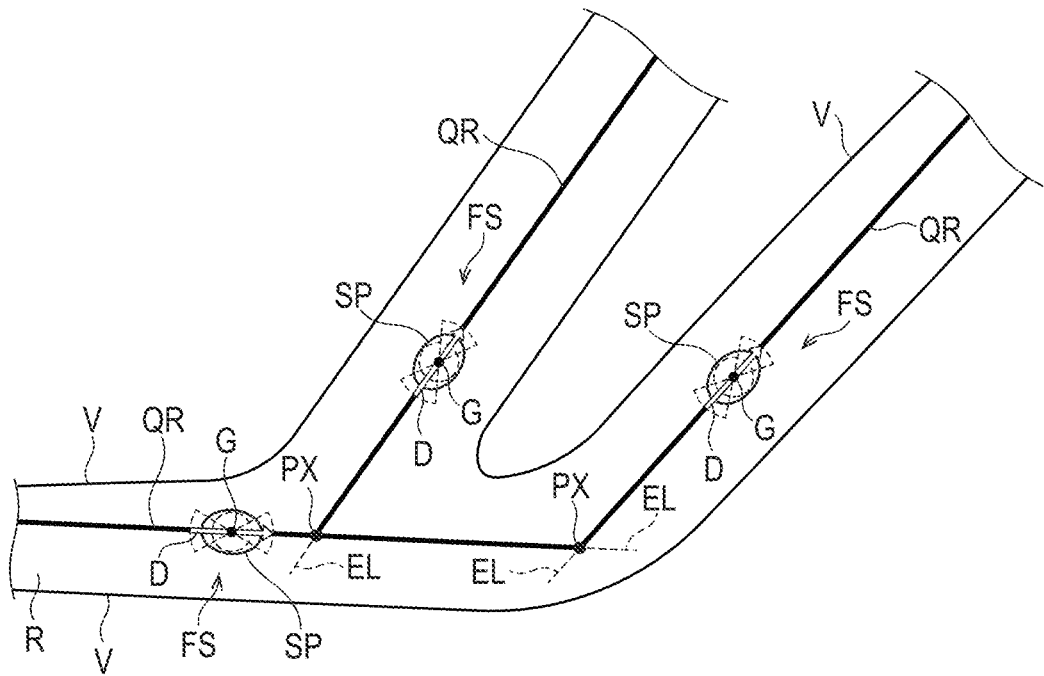
FIG. 15 is a schematic diagram illustrating an example of branch connection processing in the drawing operation of the quasi ridge line in the information processing apparatus according to the third example embodiment.
Figure 16:
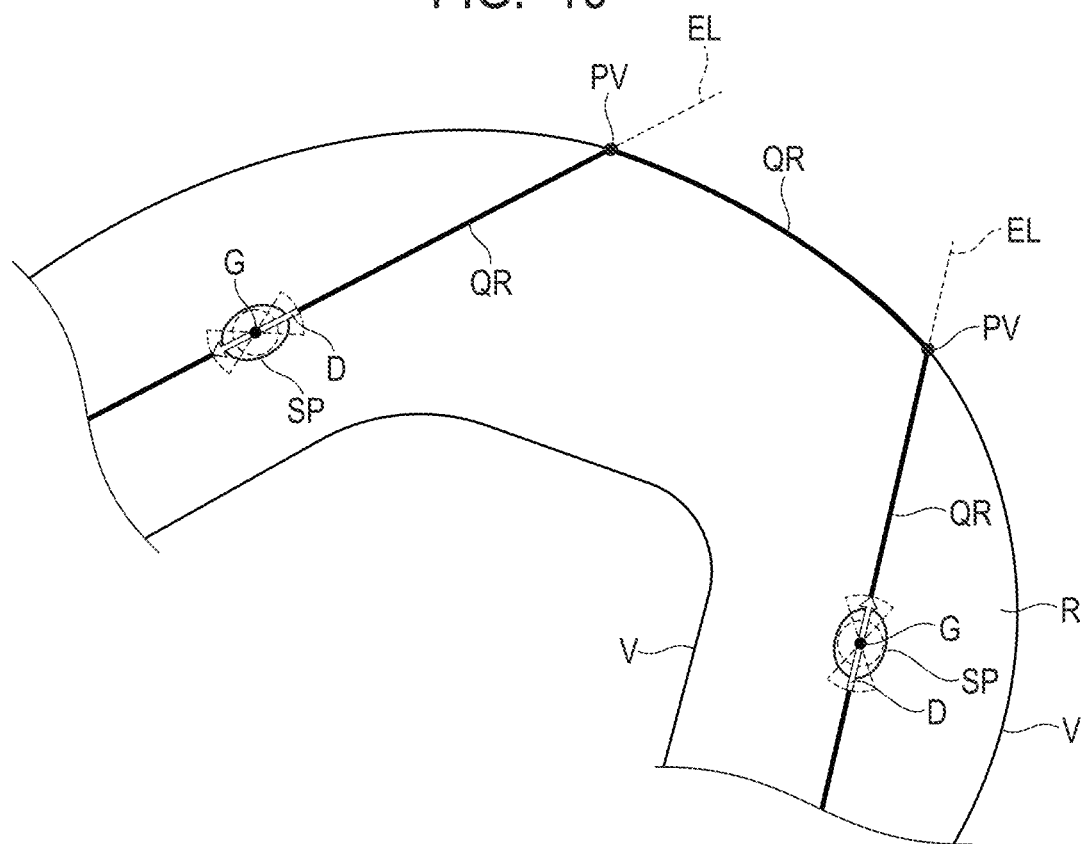
FIG. 16 is a schematic diagram illustrating an example of the connection processing using a valley line in the drawing operation of the quasi ridge line in the information processing apparatus according to the third example embodiment.
Figure 17A:
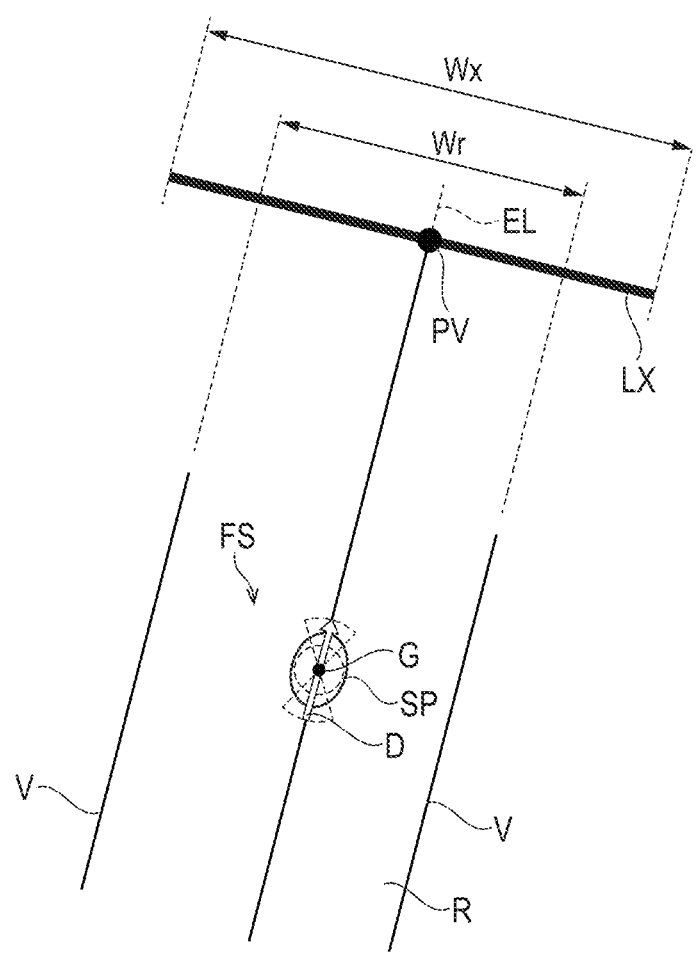
FIG. 17A is a schematic diagram illustrating an example of determination processing of a non-valley line portion in the drawing operation of the quasi ridge line in the information processing apparatus according to the third example embodiment.
Figure 17B:
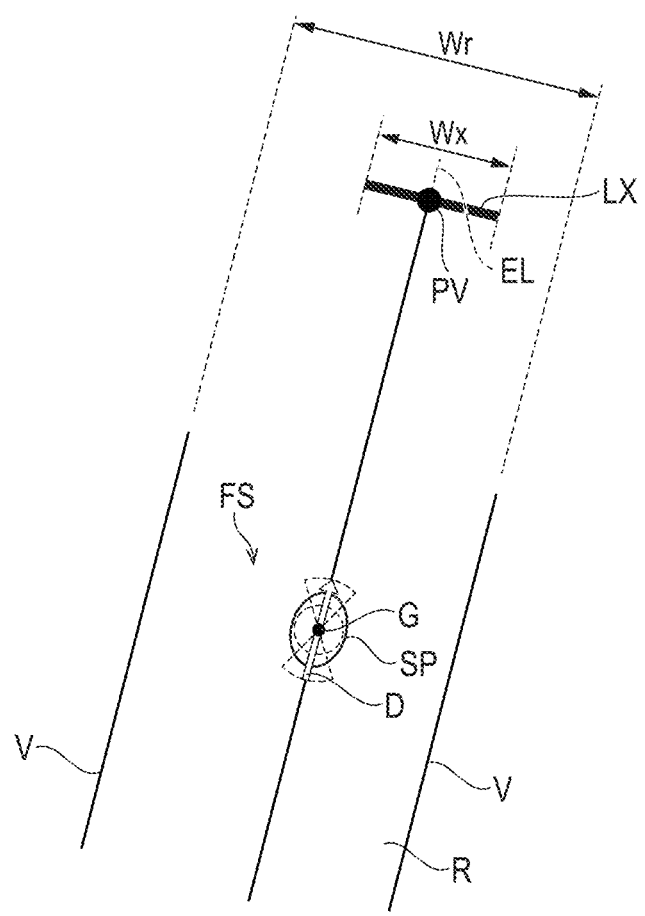
FIG. 17B is a schematic diagram illustrating an example of the determination processing of the non-valley line portion in the drawing operation of the quasi ridge line in the information processing apparatus according to the third example embodiment.
Figure 18:
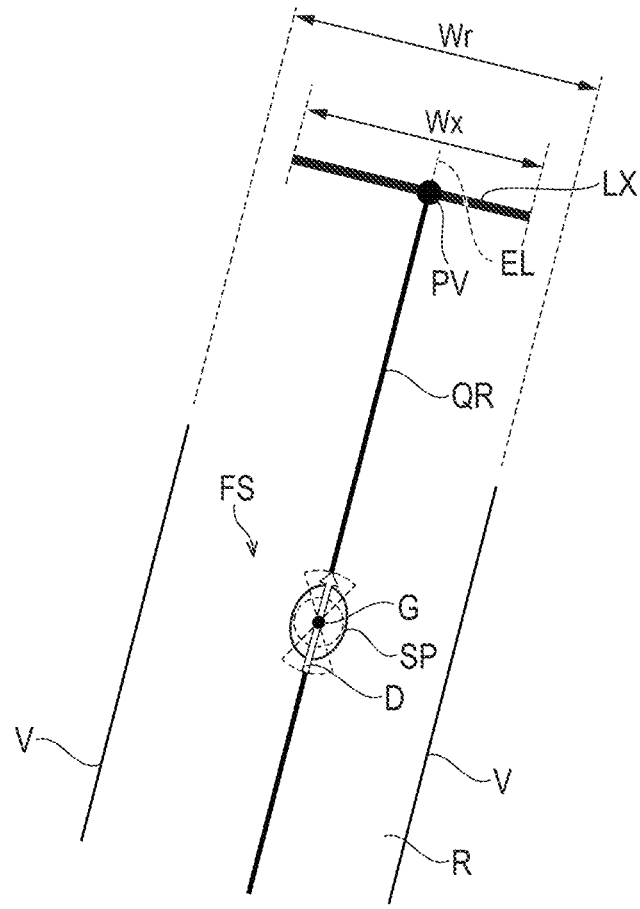
FIG. 18 is a schematic diagram illustrating an example of interruption processing of drawing in the drawing operation of the quasi ridge line in the information processing apparatus according to the third example embodiment.
Figure 19A:
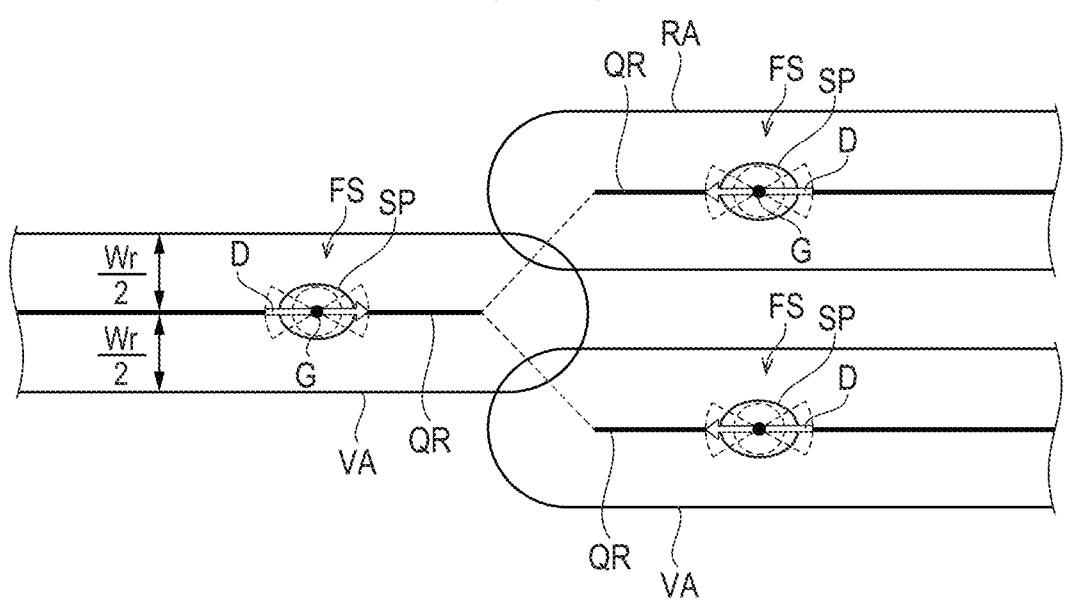
FIG. 19A is a schematic diagram illustrating another example of the branch connection processing in the drawing operation of the quasi ridge line in the information processing apparatus according to the third example embodiment.
Figure 19B:
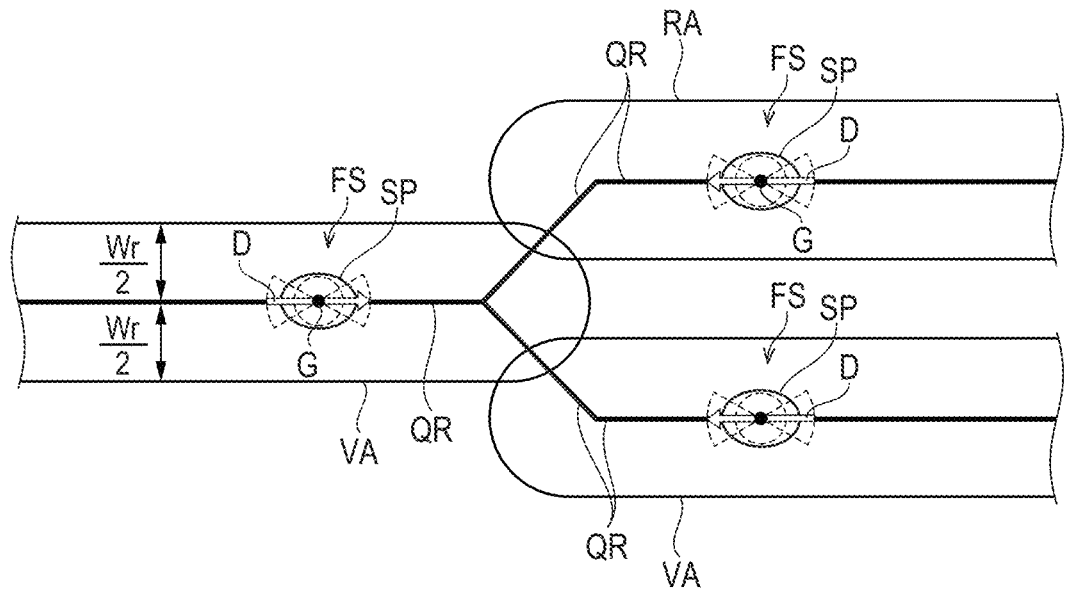
FIG. 19B is a schematic diagram illustrating another example of the branch connection processing in the drawing operation of the quasi ridge line in the information processing apparatus according to the third example embodiment.
Figure 20:
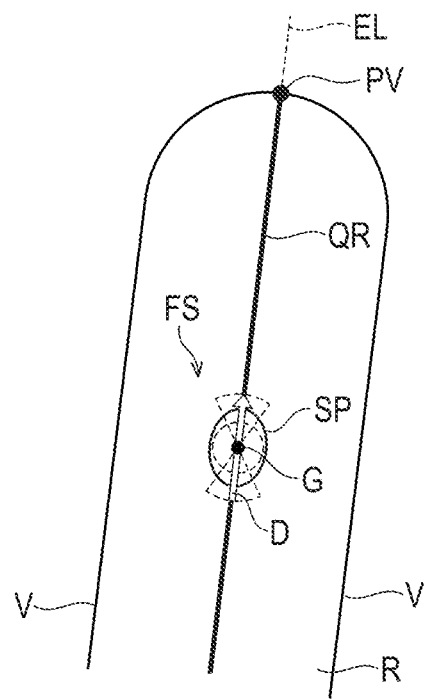
FIG. 20 is a schematic diagram illustrating an example of stop processing of the drawing at an endpoint in the drawing operation of the quasi ridge line in the information processing apparatus according to the third example embodiment.

Hereinafter, the drawing operation of the quasi ridge line in the information processing apparatus 1 according to the example embodiment will be described with reference to FIGS. 12 to 20. FIG. 12 is a flowchart illustrating the drawing operation of the quasi ridge line in the information processing apparatus 1. FIG. 13 is a schematic diagram illustrating an example of connection processing at an intersection in the drawing operation of the quasi ridge line in the information processing apparatus 1. FIG. 14 is a schematic diagram illustrating an example of the quasi ridge line drawn by connection processing at an intersection in the drawing operation of the quasi ridge line in the information processing apparatus 1. FIG. 15 is a schematic diagram illustrating an example of branch connection processing in the drawing operation of the quasi ridge line in the information processing apparatus 1. FIG. 16 is a schematic diagram illustrating an example of connection processing using a valley line in a drawing operation of a quasi ridge line in the information processing apparatus 1. FIGS. 17A and 17B are schematic diagrams illustrating an example of the determination processing of the non-valley line portion in the drawing operation of the quasi ridge line in the information processing apparatus 1. FIG. 18 is a schematic diagram illustrating an example of interruption processing of drawing in the drawing operation of the quasi ridge line in the information processing apparatus 1. FIGS. 19A and 19B are schematic diagrams illustrating another example of the branch connection processing in the drawing operation of the quasi ridge line in the information processing apparatus 1. FIG. 20 is a schematic diagram illustrating an example of the stop processing of the drawing at an endpoint in the drawing operation of the quasi ridge line in the information processing apparatus 1. The information processing apparatus 1 according to the example embodiment operates to execute an information processing method according to the example embodiment for drawing the quasi ridge line.

The information processing apparatus 1 executes steps S102 to S120 illustrated in FIG. 2 to acquire the sweat gland pore information, the reliability information, and the like, as in the case of the first example embodiment, for the fingerprint image of the target person on which the quasi ridge line is to be drawn. The information processing apparatus 1 can draw the quasi ridge line following the registration of the sweat gland pore information by the first example embodiment. It should be noted that the information processing apparatus 1 does not necessarily need to acquire the reliability information when drawing the quasi ridge line. The information processing apparatus 1 can also read out and acquire the sweat gland pore information of the target person from the sweat gland pore information DB 142 or the like in the storage unit 14.

When the sweat gland pore information is acquired from a fingerprint image of a target person to draw the quasi ridge line, the CPU 10 draws the quasi ridge line by executing the following processing by a functional unit realized by execution of a program. The CPU 10 can draw the quasi ridge line for the entire fingerprint image, or can draw the quasi ridge line for a part of a plurality of divided areas obtained by dividing the fingerprint image, for example, a divided area having a reliability score equal to or higher than a predetermined value.

First, as illustrated in FIG. 12, the ridge line drawing unit 120 acquires the sweat gland pore information acquired from the fingerprint image of the target person (step S302).

Next, the ridge line drawing unit 120 identifies two sweat gland pores located adjacent to each other in the same ridge line based on the position information included in the sweat gland pore information (step S304).

Next, the ridge line drawing unit 120 calculates, for each of the identified two sweat gland pores, an extension line that is a straight line corresponding to the position information and the direction information included in the sweat gland pore information (step S306). In this case, specifically, as illustrated in FIG. 13, the ridge line drawing unit 120 calculates the extension line EL along the direction D passing through the center of gravity G of the sweat gland pore SP as the extension line according to the position information and the direction information included in the sweat gland pore information, based on the sweat gland pore information FS of the sweat gland pore SP. Thus, the ridge line drawing unit 120 calculates the extension line which is a straight line passing through the position indicated by the position information and along the direction indicated by the direction information.

The ridge line drawing unit 120 draws the quasi ridge line in the following manner based on the extension line which is a straight line corresponding to the position information and the direction information of the sweat gland pore information thus calculated.

First, as illustrated in FIG. 12, the ridge line drawing unit 120 determines whether or not the extension lines corresponding to the position information and the direction information of the two identified sweat gland pores intersect in the ridge line where both of the sweat gland pores are located without crossing over the valley line (step S308). Specifically, as illustrated in FIG. 13, the ridge line drawing unit 120 determines whether or not the extension line EL of one sweat gland pore SP of the two identified sweat gland pores SP intersects the extension line EL of the other sweat gland pore SP within the ridge line R.

As shown in FIG. 12, when it is determined that the extension lines intersect within the ridge line (Step S308, YES), the ridge line drawing unit 120 draws the quasi ridge line connecting the two sweat gland pores through the intersection of the extension lines (step S310). In this case, specifically, as illustrated in FIG. 13, the extension line EL of one sweat gland pore SP out of the two identified sweat gland pores SP intersects the extension line EL of the other sweat gland pore SP at the intersection PX within the ridge line R where both sweat gland pores SP are located. The ridge line drawing unit 120 draws a line segment connecting the center of gravity G of one sweat gland pore SP and an intersection PX and a line segment connecting the intersection PX and the center of gravity G of the other sweat gland pore SP as a quasi ridge line QR. FIG. 14 shows an example in which the quasi ridge line QR is drawn for the divided area Pik shown in FIG. 8A or the like. FIG. 14 shows a case where the quasi ridge line QR is drawn for a part of the sweat gland pores.

Thus, the ridge line drawing unit 120 draws the quasi ridge line QR connecting one sweat gland pore SP and the other sweat gland pore SP through the intersection PX where the extension line EL of one sweat gland pore SP intersects with the extension line EL of the other sweat gland pore SP.

Further, as illustrated in FIG. 12, the ridge line drawing unit 120 determines whether it is possible to connect a branching quasi ridge line to the drawn quasi ridge line (step S312). In this case, specifically, as illustrated in FIG. 15, the ridge line drawing unit 120 determines whether one of the two extension lines EL intersecting at the intersection PX intersects the extension line EL of the further other sweat gland pore SP within the ridge line R where the respective sweat gland pores SP are located. If it is determined that the lines intersect each other, the ridge line drawing unit 120 determines that the branching quasi ridge lines can be connected.

As illustrated in FIG. 12, when it is determined that the branching quasi ridge line can be connected (step S312, YES), the ridge line drawing unit 120 draws the branching quasi ridge line connected to the drawn quasi ridge line (step S314). In this case, specifically, as illustrated in FIG. 15, one of the two extension lines EL intersecting at the intersection PX further intersects at the intersection PX with the extension line EL of the further other sweat gland pore SP. Regarding the intersection at this intersection PX, the ridge line drawing unit 120 draws a line segment connecting the center of gravity G of one sweat gland pore SP and the intersection PX and a line segment connecting the intersection PX and the center of gravity G of the other sweat gland pore SP as a quasi ridge line QR. Thus, the ridge line drawing unit 120 draws the branching quasi ridge line QR.

The processes in steps S312 and S314 can be executed independently of the series of processes shown in FIG. 12.

Next, as illustrated in FIG. 12, the ridge line drawing unit 120 determines whether or not the drawing of the quasi ridge line has been completed (step S316). If it is determined that the drawing has not been completed (step S316, NO), the ridge line drawing unit 120 proceeds to step S304 to continue drawing the quasi ridge line. When it is determined that the drawing has been completed (step S316, YES), the ridge line drawing unit 120 ends the drawing of the quasi ridge line.

If it is determined that the branching quasi ridge cannot be connected (step S312, NO), the ridge line drawing unit 120 proceeds to step S316 and executes the same processing as described above.

On the other hand, if it is determined that the extension lines do not intersect within the ridge line (step S308, NO), the ridge line drawing unit 120 determines whether or not it is possible to draw a quasi ridge line connecting the sweat gland pores by using the valley line (step S318). When the extension lines do not intersect in the ridge line, as illustrated in FIG. 16, the extension line EL of one sweat gland pore SP intersects the valley line V at the intersection PV. The extension line EL of the other sweat gland pore SP intersects the valley line V at another intersection PV. When the length of the valley line V between the two intersections PV is equal to or less than a predetermined threshold, the ridge line drawing unit 120 determines that a quasi ridge line connecting the two sweat gland pores SP can be drawn by using the valley line V. On the other hand, if the length of the valley line V between the two intersections PV exceeds a predetermined threshold, the ridge line drawing unit 120 determines that it is impossible to draw a quasi ridge line connecting the two sweat gland pores SP by using the valley line V. When a quasi ridge line cannot be drawn using the valley line V, the extension line EL of the sweat gland pore SP usually crosses the valley line V in a state orthogonal to or close to the intersection.

As shown in FIG. 12, when it is determined that the quasi ridge line can be drawn using the valley line (step 318, YES), the ridge line drawing unit 120 draws the quasi ridge line connecting the sweat gland pores using the valley line (step S320). In this case, specifically, as illustrated in FIG. 16, the ridge line drawing unit 120 draws a line segment connecting the center of gravity G of the sweat gland pore SP and the intersection PV and a portion between the two intersections PV of the valley line V as the quasi ridge line QR. The line segment connecting the center of gravity G of the sweat gland pore SP and the intersection PV is a line segment connecting the center of gravity G of one sweat gland pore SP and the intersection PV of the extension line EL and a line segment connecting the center of gravity G of the other sweat gland pore SP and the intersection PV of the extension line EL.

Thus, the ridge line drawing unit 120 draws the quasi ridge line QR connecting one sweat gland pore SP and the other sweat gland pore SP through the valley line V between the intersection PV where the extension line EL of one sweat gland pore SP intersects with the valley line V and the intersection PV where the extension line EL of the other sweat gland pore SP intersects with the valley line V.

Next, the ridge line drawing unit 120 proceeds to step S312 and executes the same processing as described above.

On the other hand, when it is determined that the quasi ridge line cannot be drawn using the valley line (step S318, NO), the ridge line drawing unit 120 determines whether or not the linear portion treated as the valley line crossing the extension line of the sweat gland pore is a non-valley line portion (step S322). The non-valley line portion has the same gradation as the valley line in the fingerprint image, but is actually a portion which is not a valley line, for example, wrinkles, scratches, dust, etc.

More specifically, as illustrated in FIGS. 17A and 17B, the ridge line drawing unit 120 compares the width Wx of the linear portion LX, which is treated as the valley line intersecting at the intersection PV with the extension line EL of the sweat gland pore SP, with the width Wr of the ridge line R where the sweat gland pore SP of the extension line EL is located. The ridge line drawing unit 120 can calculate, as the width Wr of the ridge line R, for example, the interval between the valley lines V on both sides of the nearest vicinity of the sweat gland pore SP. The ridge line drawing unit 120 can calculate, as the width Wr of the ridge line R, for example, the average value of the width of a predetermined range of the ridge line R where the sweat gland pore SP is located. Further, the ridge line drawing unit 120 can calculate the width of the linear portion LX in the same direction as the width Wr of the ridge line R, as the width Wx of the linear portion LX. Although the linear portion LX may be curved or bent, FIGS. 17A and 17B show the linear portion LX as a line segment along the same direction as the width Wr of the ridge line R for convenience. The ridge line drawing unit 120 determines whether or not the linear portion LX is a non-valley line part based on a result of comparing the width Wx of the linear portion LX with the width Wr of the ridge line R.

First, as illustrated in FIG. 17A, when the width Wx of the linear portion LX is larger than the width Wr of the ridge line R, that is, when Wx>Wr, the ridge line drawing unit 120 determines that the linear portion LX is a non-valley line portion. In this case, since the width Wx of the linear portion LX is larger than the width Wr of the ridge line R, there is a high probability that the linear portion LX is a non-valley line portion such as a wrinkle.

As shown illustrated in FIG. 17B, when the width Wx of the linear portion LX is smaller than a predetermined ratio of the width Wr of the ridge line R, that is, when Wx<α×Wr, the ridge line drawing unit 120 determines that the linear portion LX is a non-valley line portion. Here, α is a coefficient satisfying 0<α<1. The value of α can be set appropriately, for example, α=0.5. In this case, since the width Wx of the linear portion LX is smaller than a predetermined ratio of the width of the ridge line R, there is a high probability that the linear portion LX is a non-valley line portion such as a dust.

On the other hand, when none of the above is satisfied, that is, when α×Wr≤Wx≤Wr, the ridge line drawing unit 120 determines that the linear portion LX is not a non-valley line portion. In this case, the linear portion LX is a valley line and is an end point at which the quasi ridge line stops if the connection of the branching quasi ridge line is not possible as described later.

As illustrated in FIG. 12, when the linear portion is determined to be a non-valley line portion as described above (step S322, YES), the ridge line drawing unit 120 determines that the linear portion is not treated as a valley line and proceeds to step S304. Thus, the ridge line drawing unit 120 ignores the linear portion determined as the non-valley line portion and again executes the drawing of the quasi ridge line.

On the other hand, if it is determined that the linear portion is not the non-valley portion (step S322, NO), the ridge line drawing unit 120 draws a quasi ridge line up to the intersection with the linear portion and interrupts drawing of the quasi ridge (step S324). In this case, specifically, as illustrated in FIG. 18, the ridge line drawing unit 120 draws a quasi ridge line QR connecting the intersection PV of the extension line EL of the sweat gland pore SP and the linear portion LX and the center of the gravity G of the sweat gland pore SP. Thus, the ridge line drawing unit 120 draws the quasi ridge line QR up to the intersection PV and interrupts drawing of the quasi ridge line QR.

Next, as illustrated in FIG. 12, the ridge line drawing unit 120 determines whether it is possible to connect a branching quasi ridge line to the quasi ridge line of which drawing has been interrupted (step S326). In this case, specifically, as illustrated in FIG. 19A, the ridge line drawing unit 120 sets a virtual area VA corresponding to the width Wr of the ridge line R around the quasi ridge line QR of which drawing is interrupted. The virtual area VA can be set, for example, as an area in which the distance from the quasi ridge line QR is less than half the width Wr of the ridge line R. The ridge line drawing unit 120 determines whether an end part of a virtual area VA of a specific quasi ridge line QR overlaps with an end part of a virtual area VA of another quasi ridge line QR. The ridge line drawing unit 120 determines that the specific quasi ridge line QR line can be connected as a quasi ridge line branching the other two quasi ridge lines QR when the ends of the other two virtual areas VA in opposite directions overlap with the end of the specific virtual area VA from both sides.

As illustrated in FIG. 12, when it is determined that it is possible to connect the branching quasi ridge line (step S326, YES), the ridge line drawing unit 120 connects the branching quasi ridge line to the quasi ridge of which drawing has been interrupted (step S328). In this case, specifically as illustrated in FIG. 19B, the ridge line drawing unit 120 connects, with respect to the specific quasi ridge line QR, the other two quasi ridge lines QR where the virtual areas VA overlap as branching quasi ridge lines to draw them. The ridge line drawing unit 120 can redraw the quasi ridge line QR so that the connected quasi ridge line QR becomes smooth.

Thus, the ridge line drawing unit 120 draws the branching quasi ridge line based on the overlapping of the end portions of the virtual area which is an area set around the drawn quasi ridge line.

Next, as illustrated in FIG. 12, the ridge line drawing unit 120 proceeds to step S316 and executes the same processing as described above.

On the other hand, if it is determined that the branching quasi ridge cannot be connected (step S326, NO), the ridge line drawing unit 120 stops drawing the quasi ridge of which drawing has been interrupted (step S330). In this case, specifically, as illustrated in FIG. 20, the ridge line drawing unit 120 stops drawing the quasi ridge line QR with the intersection PV with the valley line which serves as the end of the quasi ridge line QR as an endpoint.

Next, as illustrated in FIG. 12, the ridge line drawing unit 120 proceeds to step S316 and executes the same processing as described above.

Note that the processes from steps S322 to S330 can be executed independently of the series of processes illustrated in FIG. 12 when a linear portion crossing the extension line of the sweat gland pore in a state orthogonal thereto or close to the orthogonal to thereto is detected.

Thus, the ridge line drawing unit 120 draws the thinned quasi ridge line based on the position information and the direction information of the sweat gland pore included in the sweat gland pore information in the fingerprint image from which the sweat gland pore information has been acquired. The ridge line drawing unit 120 can store the image data of the drawn quasi ridge in the storage unit 14 in association with the sweat gland pore information used for drawing. The drawn quasi ridge lines can be used, for example, for a fingerprint matching by a minutia system, a pattern matching system or the like.

Thus, according to the example embodiment, since the quasi ridge line is drawn based on the sweat gland pore information including the position information and the direction information of the sweat gland pore, it is possible to draw the thinned ridge line with high accuracy.

In the example embodiment, quasi ridge lines are drawn based on the sweat gland pores themselves, so that the sweat gland pores are not erroneously detected as discontinuous valley lines. Therefore, in the example embodiment, since the ridge line is not erroneously divided by the mis-detected valley line, it is possible to realize the drawing of the quasi ridge line with high accuracy. Especially in newborns and infants, sweat gland pores are often mis-detected as discontinuous valley lines because the width of sweat gland pores is relatively large compared to the width of valley lines. Even in such cases, according to the example embodiment, the thinned ridge lines can be drawn with high accuracy.

Other Example Embodiment

Figure 21:
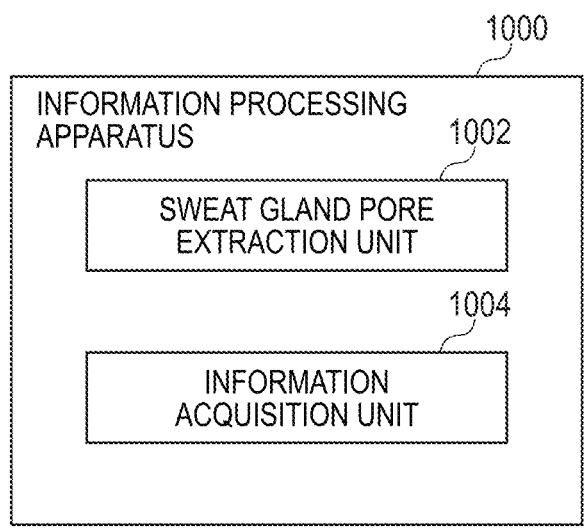
FIG. 21 is a block diagram illustrating a configuration of an information processing apparatus according to another example embodiment.

The information processing apparatus described in the example embodiments may be configured as illustrated in FIG. 21 according to another example embodiment. FIG. 21 is a block diagram illustrating a configuration of an information processing apparatus according to another example embodiment.

As illustrated in FIG. 21, the information processing apparatus 1000 according to another example embodiment includes a sweat gland pore extraction unit 1002 that extracts sweat gland pores from an image including a skin marking. The information processing apparatus 1000 includes an information acquisition unit 1004 that acquires sweat gland pore information including position information about the sweat gland pore and direction information about the sweat gland pore for each of the sweat gland pores.

According to the information processing apparatus 1000 provided by another example embodiment, the sweat gland pore information including not only the position information about the sweat gland pores but also the direction information about the sweat gland pores is acquired as feature information, so that it is possible to acquire the feature information relating to the sweat gland pores that can realize highly accurate identification of an individual.

Modified Example Embodiment

The disclosure is not limited to the example embodiments described above, and various modifications are possible.

For example, in the example embodiments described above, the case where a fingerprint image is imaged by the fingerprint imaging unit 18 is described as an example, but the disclosure is not limited thereto. The information processing apparatus 1 may not have a fingerprint imaging unit 18. In this case, the fingerprint image is imaged by a fingerprint imaging device which is a device separate from the information processing apparatus 1. The information processing apparatus 1 can be configured, for example, to read and acquire a fingerprint image from a storage medium storing the fingerprint image imaged by a fingerprint imaging device, or to receive and acquire a fingerprint image via a network.

In addition, in the example embodiments described above, the process of dividing the fingerprint image into the plurality of divided areas and acquiring sweat gland pore information is performed as an example, but the disclosure is not limited to this. The information processing apparatus 1 can also execute processing for acquiring sweat gland pore information without dividing the fingerprint image into a plurality of divided areas.

In addition, in the example embodiments described above, the case where the sweat gland pore information is acquired from the fingerprint image is described as an example, but the disclosure is not limited thereto. The information processing apparatus 1 acquires the sweat gland pore information from an image including a skin marking of an area including the sweat gland pores and forming a pattern on the skin, in addition to a fingerprint image, performs matching of the sweat gland pore information, and performs drawing of the quasi ridge line.

Further, the scope of each of the example embodiments includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, for example, a floppy (registered trademark) disk, a hard disk, an optical disk, a magneto-optical disk, a compact disc-read only memory (CD-ROM), a magnetic tape, a nonvolatile memory card, or a ROM can be used. Further, the scope of each of the example embodiments includes an example that operates on operating system (OS) to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

An information processing apparatus comprising:
  a sweat gland pore extraction unit that extracts sweat gland pores from an image including a skin marking; and
  an information acquisition unit that acquires sweat gland pore information including position information about the sweat gland pore and directional information about the sweat gland pore for each of the sweat gland pores.

(Supplementary Note 2)

The information processing apparatus according to supplementary note 1,
  wherein the information acquisition unit acquires the direction information based on directions of valley lines on both sides of a ridge line where the sweat gland pore is located.

(Supplementary Note 3)

The information processing apparatus according to supplementary note 1 or 2,
  wherein the sweat gland pore extraction unit extracts the sweat gland pore based on information relating to gradation of the image.

(Supplementary Note 4)

The information processing apparatus according to supplementary note 3,
  wherein the sweat gland pore extraction unit extracts an area of a predetermined gradation range that fits in a closed ring in the image as the sweat gland pore.

(Supplementary Note 5)

The information processing apparatus according to supplementary note 3 or 4,
  wherein the sweat gland pore extraction unit extracts an area of a predetermined gradation range that fits in a ring partially opened in the image as the sweat gland pore.

(Supplementary Note 6)

The information processing apparatus according to any one of supplementary notes 1 to 5, further comprising an error setting unit that sets an error tolerance range for at least one of the position information and the direction information.

(Supplementary Note 7)

The information processing apparatus according to any one of supplementary notes 1 to 6, further comprising a matching unit that matches first sweat gland pore information acquired on the first image and second sweat gland pore information acquired on the second image.

(Supplementary Note 8)

The information processing apparatus according to supplementary note 7,
  wherein the matching unit matches the first position information of the first sweat gland pore information and the second position information of the second sweat gland pore information.

(Supplementary Note 9)

The information processing apparatus according to supplementary note 7 or 8,
wherein the matching unit matches the first direction information of the first sweat gland pore information and the second direction information of the second sweat gland pore information.

(Supplementary Note 10)

The information processing apparatus according to any one of supplementary notes 7 to 9, further comprising:
an image division unit that divides the image into a plurality of divided areas; and
a reliability acquisition unit that acquires reliability information about reliability of the divided area according to the number of the sweat gland pores extracted in the divided area,
wherein the matching unit matches the sweat gland pore information about the divided area having a predetermined reliability or higher among the plurality of divided areas.

(Supplementary Note 11)

The information processing apparatus according to supplementary note 10, further comprising a determination unit that determines whether or not a target person from whom the first image has been acquired is a registrant from whom the second image has been acquired, based on a matching result for each of the divided areas by the matching unit and the reliability information of the divided area.

(Supplementary Note 12)

The information processing apparatus according to any one of supplementary notes 1 to 11,
wherein the position information is coordinate information of the center of gravity of the sweat gland pore.

(Supplementary Note 13)

The information processing apparatus according to any one of supplementary notes 1 to 12,
wherein the direction information is information indicating a direction obtained by averaging directions of valley lines on both sides located nearest to the center of gravity of the sweat gland pore.

(Supplementary Note 14)

The information processing apparatus according to any one of supplementary notes 1 to 13, wherein the skin marking is a fingerprint.

(Supplementary Note 15)

An information processing method comprising:
extracting sweat gland pores from an image including a skin marking; and
acquiring sweat gland pore information including position information about the sweat gland pore and directional information about the sweat gland pore for each of the sweat gland pores.

(Supplementary Note 16)

A storage medium storing a program that causes a computer to perform:
extracting sweat gland pores from an image including a skin marking; and
acquiring sweat gland pore information including position information about the sweat gland pore and directional information about the sweat gland pore for each of the sweat gland pores.

As described above, although the disclosure has been described with reference to the example embodiments, the disclosure is not limited to the example embodiments described above. Various modifications that may be understood by those skilled in the art can be made to the configuration or details of the disclosure within the scope of the disclosure.

REFERENCE SIGNS LIST

1 . . . information processing apparatus
10 . . . CPU
12 . . . RAM
14 . . . storage unit
16 . . . input unit
18 . . . fingerprint imaging unit
20 . . . display unit
22 . . . common bus
102 . . . image acquisition unit
104 . . . image division unit
106 . . . sweat gland pore extraction unit
108 . . . direction detection unit
110 . . . error setting unit
112 . . . reliability acquisition unit
114 . . . registration unit
116 . . . matching unit
118 . . . determination unit
120 . . . ridge line drawing unit
1162 . . . position matching unit
1164 . . . direction matching unit

The invention claimed is:

1. An information processing apparatus comprising:
one or more processors; and
a memory storing instructions executable by the one or more processors to:
extract sweat gland pores from an image including a skin marking; and
acquire sweat gland pore information including position information about the sweat gland pore and directional information about the sweat gland pore for each of the sweat gland pores,
wherein the direction information is information indicating a direction obtained by averaging directions of valley lines on both sides located nearest to the center of gravity of the sweat gland pore.

2. The information processing apparatus according to claim 1, wherein the instructions are executable by the one or more processors to further:
acquire the direction information based on the directions of the valley lines on both sides of a ridge line where the sweat gland pore is located.

3. The information processing apparatus according to claim 1, wherein the instructions are executable by the one or more processors to further:
extract the sweat gland pore based on information relating to gradation of the image.

4. The information processing apparatus according to claim 3, wherein the instructions are executable by the one or more processors to further:
extract an area of a predetermined gradation range that fits in a closed ring in the image as the sweat gland pore.

5. The information processing apparatus according to claim 3, wherein the instructions are executable by the one or more processors to further:
extract an area of a predetermined gradation range that fits in a ring partially opened in the image as the sweat gland pore.

6. The information processing apparatus according to claim 1, wherein the instructions are executable by the one or more processors to further:

set an error tolerance range for at least one of the position information and the direction information.

7. The information processing apparatus according to claim 1, wherein the image is a first image, and the instructions are executable by the one or more processors to further:
   match first sweat gland pore information acquired on the first image and second sweat gland pore information acquired on the second image.

8. The information processing apparatus according to claim 7,
   wherein first position information of the first sweat gland pore information and second position information of the second sweat gland pore information are matched.

9. The information processing apparatus according to claim 7,
   wherein first direction information of the first sweat gland pore information and second direction information of the second sweat gland pore information are matched.

10. The information processing apparatus according to claim 7, wherein the instructions are executable by the one or more processors to further:
    divide the image into a plurality of divided areas; and
    acquire reliability information about reliability of each divided area according to a number of the sweat gland pores extracted in the divided area,
    wherein the sweat gland pore information about the divided area having a predetermined reliability or higher among the plurality of divided areas is matched.

11. The information processing apparatus according to claim 10, wherein the instructions are executable by the one or more processors to further:
    determine whether or not a target person from whom the first image has been acquired is a registrant from whom the second image has been acquired, based on a matching result for each of the divided areas by the matching unit and the reliability information of the divided area.

12. The information processing apparatus according to claim 1,
    wherein the position information is coordinate information of the center of gravity of the sweat gland pore.

13. The information processing apparatus according to claim 1, wherein the skin marking is a fingerprint.

14. An information processing method comprising:
    extracting sweat gland pores from an image including a skin marking; and
    acquiring sweat gland pore information including position information about the sweat gland pore and directional information about the sweat gland pore for each of the sweat gland pores
    wherein the direction information is information indicating a direction obtained by averaging directions of valley lines on both sides located nearest to the center of gravity of the sweat gland pore.

15. A non-transitory storage medium storing a program that causes a computer to perform:
    extracting sweat gland pores from an image including a skin marking; and
    acquiring sweat gland pore information including position information about the sweat gland pore and directional information about the sweat gland pore for each of the sweat gland pores
    wherein the direction information is information indicating a direction obtained by averaging directions of valley lines on both sides located nearest to the center of gravity of the sweat gland pore.

* * * * *